(12) United States Patent
Edgar

(10) Patent No.: US 12,242,923 B2
(45) Date of Patent: Mar. 4, 2025

(54) SYSTEM, METHOD, AND COMPUTER PROGRAM PRODUCT FOR REDUCTION, OPTIMIZATION, SECURITY, AND ACCELERATION OF COMPUTER DATA TRANSMISSION USING NEURAL SYNCHRONIZATION

(71) Applicant: David Allan Edgar, Brentwood, MD (US)

(72) Inventor: David Allan Edgar, Brentwood, MD (US)

( * ) Notice: Subject to any disclaimer, the term of this patent is extended or adjusted under 35 U.S.C. 154(b) by 166 days.

(21) Appl. No.: 16/577,294

(22) Filed: Sep. 20, 2019

(65) Prior Publication Data

US 2020/0097832 A1     Mar. 26, 2020

Related U.S. Application Data

(60) Provisional application No. 62/734,443, filed on Sep. 21, 2018.

(51) Int. Cl.
*G06N 10/00*      (2022.01)
*G06N 3/004*      (2023.01)
*G06N 3/10*        (2006.01)

(52) U.S. Cl.
CPC ............ *G06N 10/00* (2019.01); *G06N 3/004* (2013.01); *G06N 3/10* (2013.01); *G05B 2219/39292* (2013.01); *G05B 2219/39385* (2013.01)

(58) Field of Classification Search
CPC .......... G06N 10/00; G06N 3/10; G06N 3/004; G05B 2219/39292; G05B 2219/39385
See application file for complete search history.

(56) References Cited

U.S. PATENT DOCUMENTS 9,264,225 B1 *   2/2016   Hunt ...................... H04L 9/0852
9,412,051 B1 *   8/2016   Chelian .................. G06N 3/049
(Continued)

OTHER PUBLICATIONS

Nicolas Riche ("VISION: Video and Image Saliency Detection", PhD Dissertation, University of Mons, 2015, pp. 1-257) (Year: 2015).*

(Continued)

*Primary Examiner* — Vincent Gonzales
*Assistant Examiner* — Chase P. Hinckley

(57) ABSTRACT

Systems and methods are described herein which may be implemented using computer programs comprising instructions that replicate the neural synchronization algorithm of the human brain. These implementations result in reduction, optimization, security and acceleration of data records/frames and processing in a computer system or network. An embodiment of the invention comprises motion decimation, motions reactor, motion replicator and motion aggregator modules for replicating higher intelligence functions, and a management module for configuring resources and monitoring system operation. Systems and methods as described herein may operate on wired or wireless computer networks. Data are translated from original format into thalamic motion and further encoded with motion signal protocol, then reproduced and aggregated using thalamic motion for integration with higher forms of intelligence. By duplicating the human brain's neural synchronization process, overall process and communication efficiency may be dramatically increased.

16 Claims, 8 Drawing Sheets

(56) References Cited

U.S. PATENT DOCUMENTS

| | | | | |
|---|---|---|---|---|
| 10,176,382 | B1* | 1/2019 | Owechko | G06K 9/627 |
| 10,318,742 | B1* | 6/2019 | Sankruthi | G06F 21/577 |
| 10,715,319 | B2* | 7/2020 | Pitalúa | H04L 1/0618 |
| 11,251,952 | B2* | 2/2022 | Lamas-Linares | H04L 9/12 |
| 2008/0208783 | A1* | 8/2008 | Jaros | G06N 3/049 |
| | | | | 706/21 |
| 2009/0106007 | A1* | 4/2009 | Massaquoi | G06N 3/04 |
| | | | | 703/11 |
| 2015/0332163 | A1* | 11/2015 | Schroff | G21K 1/003 |
| | | | | 250/505.1 |
| 2018/0014041 | A1* | 1/2018 | Chen | H04L 65/612 |
| 2018/0349764 | A1* | 12/2018 | Zhang | G06N 3/063 |
| 2019/0277957 | A1* | 9/2019 | Chandrasekhar | G01S 5/017 |
| 2019/0295305 | A1* | 9/2019 | Yang | G06N 3/044 |
| 2019/0359661 | A1* | 11/2019 | Mohanty | A61K 47/6425 |
| 2021/0272003 | A1* | 9/2021 | Rigetti | G06N 10/40 |

OTHER PUBLICATIONS

Yan et al. ("Video Encryption and Decryption on Quantum Computers", Int J Theor Phys, 54, 2015, pp. 2893-2904) (Year: 2015).*

Yan et al. ("Quantum image processing: A review of advances in its security technologies", International Journal of Quantum Information, vol. 15, No. 3, 2017, pp. 1-18) (Year: 2017).*

Tian et al. ("Authentication and copyright protection watermarking scheme for H.w64 based on visual saliency and secret sharing", Multimed Tools Appl., 74, 2015, pp. 2991-3011) (Year: 2015).*

Konar et al. ("A quantum bi-directional self-organizing neural network (QBDSONN) architecture for binary object extraction from a noisy perspective", Applied Soft Computing 46, 2016, pp. 731-752) (Year: 2016).*

12. Aytekin et al. ("Visual saliency by extended quantum cuts." 2015 IEEE international conference on image processing (ICIP). IEEE, 2015, pp. 1692-1696) (Year: 2016).*

Rikhye et al., "Toward an Integrative Theory of Thalamic Function" Apr. 4, 2018, pp. 163-183. (Year: 2018).*

Whitmire et al., "Information Coding through Adaptive Gating of Synchronized Thalamic Bursting" Feb. 2, 2016, pp. 795-807. (Year: 2016).*

Caleffi et al., "Quantum Internet: from Communication to Distributed Computing!" May 11, 2018, arXiv: 1805.04360v1, pp. 1-4. (Year: 2018).*

Dehghani et Wimmer, "A computational perspective of the role of the Thalamus in cognition" Apr. 16, 2018, arXiv: 1803.00997v2, pp. 1-16. (Year: 2018).*

Villegas et al., "Decomposing Motion and Content for Natural Video Sequence Prediction" Jan. 8, 2018, arXiv: 1706.08033v2, pp. 1-22. (Year: 2018).*

Hameroff, Stuart R., "The Brain is Both Neurocomputer and Quantum Computer" 2007, pp. 1035-1045. (Year: 2007).*

Laskar et al., "Correspondence of Deep Neural Networks and the Brain for Visual Textures" Jun. 7, 2018, arXiv: 1806.02888v1, pp. 1-17. (Year: 2018).*

Singh et al., "Online Real-time Multiple Spatiotemporal Action Localisation and Prediction" Aug. 24, 2017, arXiv: 1611.08563v6, pp. 1-10. (Year: 2017).*

Bolus et al., "Design strategies for dynamic closed-loop optogenetic neurocontrol in vivo" Jan. 25, 2018, pp. i-18. (Year: 2018).*

Herron et al., "Cortical Brain Computer Interface for Closed-Loop Deep Brain Stimulation" 2017, pp. 1-7. (Year: 2017).*

Saleem et al., "Methods for predicting cortical Up and Down states from the phase of deep layer local field potentials" 2010, pp. 49-62. (Year: 2010).*

Yao et al., "Quantum Image Processing and Its Application to Edge Detection: Theory and Experiment" Jan. 4, 2018, arXiv: 1801.01465v1, pp. 1-13. (Year: 2018).*

Gyongyosi et Imre, "Entanglement Availability Differentiation Service for the Quantum Internet" Aug. 23, 2018, arXiv: 1808.07859v1, pp. 1-18. (Year: 2018).*

Dahlberg et Wehner, "SimulaQron—A simulator for developing quantum internet software" Jul. 14, 2018, arXiv: 1712.08032v2, pp. 1-13. (Year: 2018).*

* cited by examiner

FIG. 4
Motion Management Module 58

MSP Data Frame 70

FIG. 6

Artificial Brain
Operation 130

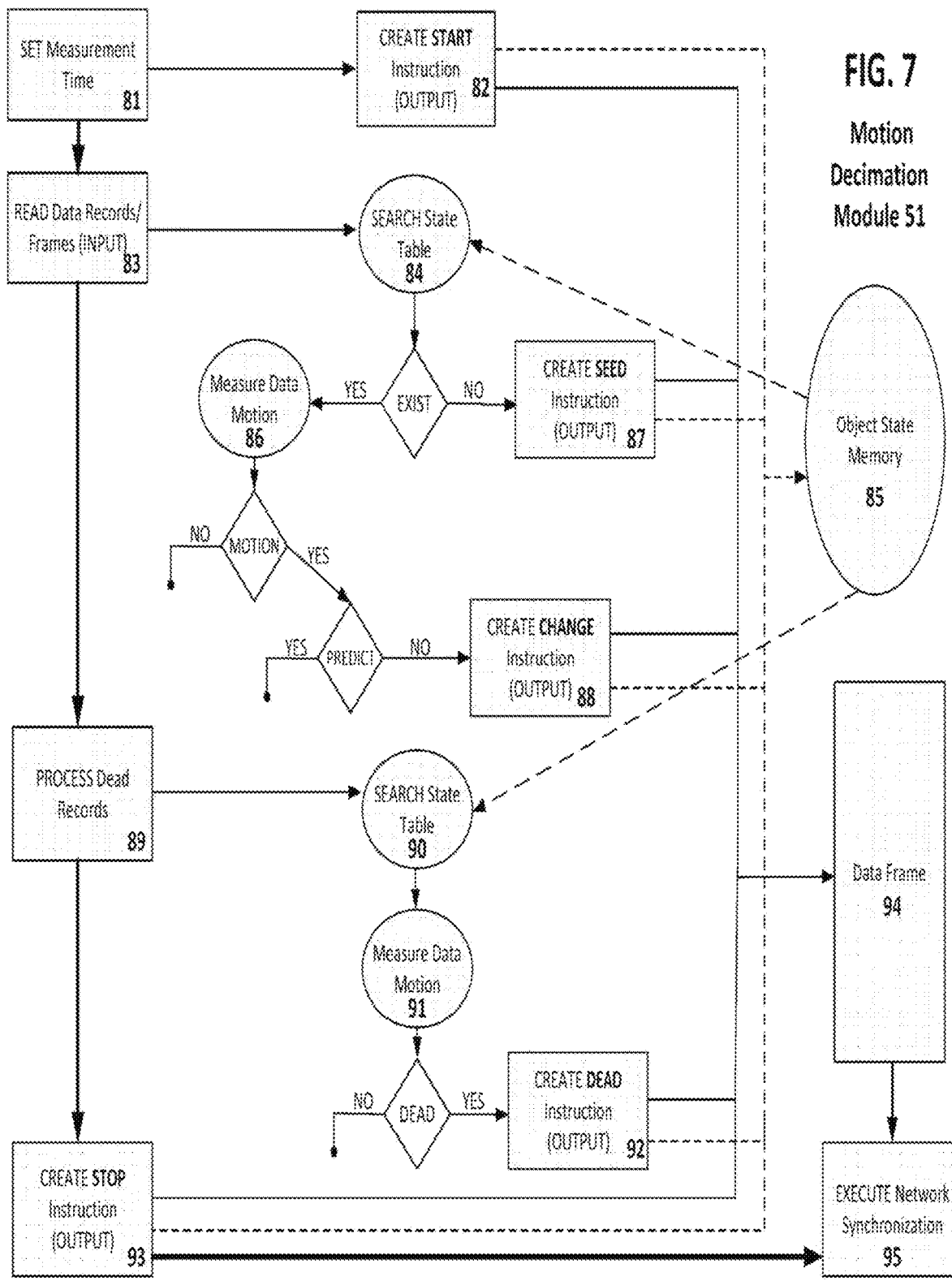

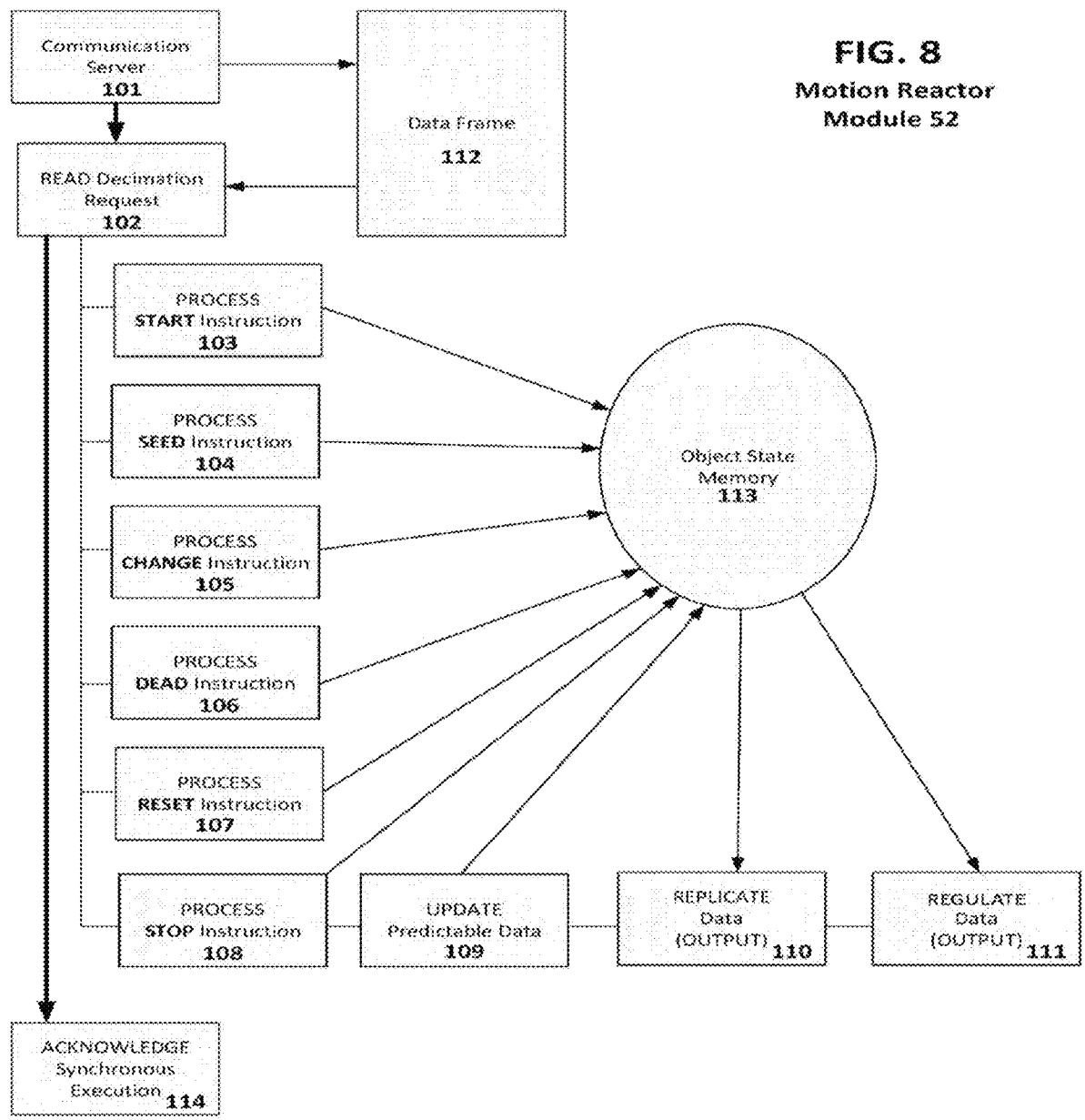

SYSTEM, METHOD, AND COMPUTER PROGRAM PRODUCT FOR REDUCTION, OPTIMIZATION, SECURITY, AND ACCELERATION OF COMPUTER DATA TRANSMISSION USING NEURAL SYNCHRONIZATION

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office, but otherwise reserves all copyright rights.

BACKGROUND OF THE INVENTION

1. Field of the Invention

The present invention relates, generally, to computer networks and communication systems and, more particularly, to the transport and processing of data records/frames in computer networks and communication systems.

2. Discussion of the Background

The industry's current methods and processing models used for transmitting data across the network are antiquated and are inherently inefficient. Next-generation Cloud solutions are going to be expensive to maintain, prone to failure, limited in scope, and require complex security requirements to even function at a basic level. The World's blind push for data standardization has focused purely on the human aspects of information exchange in which data is inflated (metadata) to accommodate the ability for humans to read it. Moreover, the data is sent across the network one at a time in the exact same processing pattern as human verbal communication on a telephone. Words are spoken and sent one syllable at a time to be received and heard one syllable at time.

Nothing has been done to enhance or optimize the transportation aspects of network data. As far as industry is concerned, the network is a dumb highway that only routes data to needed destinations and has a planned maximum traffic load. It is a transportation system with no understanding of the data being moved and therefore has no ability to organize or prioritize individual data loads. It is mindless process that treats all data the same.

Sending vast amounts of data across the network using human verbal communication patterns is completely ludicrous and destined for failure. By modeling network communication on primitive human verbal communication, it has been crippled in its natural ability to optimize processing. As a result, massive amounts of computer and network resources are wasted in a rather expensive attempt to achieve next-generational cloud services.

Sending data across the network is a transportation business that measures costs through total weight (bytes) and the number of packages (frames). Until industry sees it this way and allows their computers access to more advanced forms of data communication, they will continue to fail and the costs will continue to rise.

The currency used for determining network costs is measured in the number of bytes and number of frames transferred across the network over a given time period. A byte is how a computer represents an individual character in digital format. Each of these bytes has a number of bits (1's and 0's), usually 8. When added together, they equal a digital number that cross-lists to a table (code page/character set) that produces characters, some printable, some not. A network frame is the package/container that holds the actual data being transmitted across the network. The frames are eventually converted to network packets.

Network bandwidth is actually sold and represented in Kbps (Kilobits per second) or Mbps (Megabits per second). While the number of bits is good for measuring general network capacity, it is inappropriate for the understanding and measuring data costs. Individual bits is a binary translation concern, it has nothing to do with the formation of characters and the number of frames needed to communicate different types of data across the network. So, all data costs should be measured in byte size per time-interval; such as, Kilobytes per minute or Megabytes per minute and network frames per minute.

$$bytes/time+(frames/time*network\ overhead)=costs.$$

The simple goal of network programming is to move the data from Point A to Point B. For example, an oxygen sensor produces a measurement at Point A and it is transmitted to a database server at Point B. What happens between A and B are where our costs are determined. The data costs is incurred from the different computer processing levels that generate all the bytes and frames necessary to prepare a data payload for network transmission. The payload consists of the original data plus any protocols or packaging needed to send it across the network. While the goal of network programming is simple, its correct implementation is hotly debated. For the purposes of bandwidth reduction, the concern must be costs in bytes and costs in frames.

Network data is organized and sequenced with individual data records/frames. The record/frame is the basic storage unit and it captures a data event. A data event occurs when a data producer, such as sensor, at some specific time produces a data record/frame. Each data record/frame consists of a number of data fields. The data fields contain all the information about the data event, such as its timestamp, name, measurement, type etc. A data field can be anything from images to simple numbers. Both records and fields have varying degrees of overhead, which are extra bytes added to the frame payload to identify and organize the data structure.

Each record also gets additional payload when it is translated into a structured messaging protocol. Messaging protocols are at the heart of network programming and contain all the commands necessary for communicating data reliably. The message, also known as the Data Frame is further translated into one or more network frames, and is ultimately sent across the network. The network frame can be thought of as a locomotive pulling one box car full of data. A typical network frame is 1518 bytes of which 18 bytes is for the locomotive and 1500 bytes is for the box car which is called the MTU (Message Transfer Unit). If the Data Frame is too large, multiple locomotives will be required.

Calculating the cost of network communication can be broken down into the following basic equations:

$$Messaging\_Overhead+Record\_Overhead+(Field\_Total*(Average\_Field\_Size+Average\_Field\_Overhead))=Data\_Frame\_Size$$

$$Records\_per\_Minute*Data\_Frame\_Size=Payload\_Bytes\_per\_minute$$

$$ROUNDUP(Data\_Frame\_Size/Network\_Frame\_Size)=Network\_Frames$$

Records_per_Minute*(Network_Frames*
(Frame_Overhead+Network_Overhead))=Network_Bytes_per_minute (Payload_Bytes_per_minute+Network_Bytes_per_minute)*Cost_per_Byte=Total_Cost_per_minute.

The computer network industry is currently impaled on these equations because of outdated and obsolete data processing methods. There is no real conscious understanding of this data other than its basic structure. Resource waste in everywhere occurring at every level. Industry, instead of trying to reduce some of these costs, has gone in the opposite direction. Through unbridled data standardization and metadata accumulation, the Record_Overhead and Field_Overhead numbers have escalated with increases measured in hundreds, if not thousands, of a percent. Internet Protocol network frame efficiency is not commonly practiced by any levels of the application software industry. These figures need to go in the opposite direction. Otherwise, large data increases, as seen with next-generation sensor networks, will eventually grind the entire Cloud to a stop.

The only form of data optimization currently available to the industry comes in the form of basic pattern reduction, also referred to as data compression. A compression algorithm removes consecutive repeated bytes and byte patterns within the data frame and provides a simple control protocol so they can be reinserted when the data payload is eventually decompressed. While these algorithms can be effective tools for reducing some of the network bandwidth (10% to 40%), these gains are meaningless when faced with the data growth curves projected by the next generation of sensor and automated smart systems (100% to 10,000%). Also, in most sensor implementations where record size is small, compression does absolutely nothing to reduce the number of network frames with its associated network overhead.

Changing the cost equation requires a radical departure from the current network data processing model. In the current model each record is stateless, neither anticipated, nor predicted. There is no past, no future, just the present state of the data is known. This restriction is devastating in its implication to higher levels of data efficiency and chains the cost equation around the necks of all future generations. When dealing with highly repetitive (time-series) data streams such those encountered in sensors networks, smart devices, and automation systems, a human verbal communication pattern is neither practical, nor feasible.

Thus, notwithstanding the available hardware solutions, transport software implementations, architectures, and middleware, there is a need for a system, method, and computer program product that provides reduced bandwidth, increased speed, higher reliability, and better security in the transmission and processing of data records/frames in computer networks and communication systems. Further, there is a need for a processing system, method, and computer program product that provides such reduced bandwidth, increased speed, higher reliability, and better security, (1) that can reduce, optimize, secure, and accelerate computer data transport and processing, (2) that can more efficiently utilize existing bandwidth in communications systems and computer networks, (3) that is highly scalable, extensible, and flexible, (4) that can seamlessly integrate with any hardware platform, operating system, and any desktop and enterprise application, (5) that can seamlessly integrate with any data record/frame protocol, (6) that can be implemented on any wired or wireless communication medium, (7) that can be used to create human-level artificial intelligence and neural interfaces, (8) and that can eliminate over 99% of existing data record/frame communication and processing requirements.

SUMMARY OF THE INVENTION

The primary object of the present invention is to overcome the deficiencies of the prior art described above by providing a system, method, and computer program product that can utilize a neural synchronization architecture to reduce, optimize, secure, and accelerate the transmission and processing of data records/frames in communication systems, computer networks, and the applications utilizing those systems and networks.

Another key object of the present invention is to provide a system, method, and computer program product that can more efficiently utilize existing bandwidth in communication systems and computer networks.

Still another key object of the present invention is to provide a system, method, and computer program product that can reduce the amount of data bytes and network frames required to be transmitted in communication systems and computer networks in order to process electronic data records/frames through the use of thalamic motion.

Yet another key object of the present invention is to provide a system, method, and computer program product that can substantially increase the performance and the end-to-end response time in communication systems, computer networks, and the applications that utilize those systems and networks to achieve real-time operation.

Still another key object of the present invention is to provide a system, method, and computer program product that allows for the conversion of all computer data records and data frames to data entropy, enabling a significant increase in system performance and reliability for all data transmission and processing operations.

Still another key object of the present invention to provide a system, method, and computer program product that can reduce, optimize, secure, and accelerate the transmission and processing of data records/frames in communication systems and computer networks that is designed to eliminate unnecessary network frame usage in the transport of computer records/frames and the overhead associated therewith.

It is yet another object of the present invention to provide a system, method, and computer program product for reduced, optimized and accelerated data transmission and processing that is highly scalable, extensible, and flexible.

Yet another object of the present invention is to provide a system, method, and computer program product for reduced, optimized, secured, and accelerated data transmission and processing having an architecture and design that enables substantially seamless integration with any hardware platform, operating system, and any desktop and enterprise application.

It is a further object of the present invention to provide a system, method, and computer program product for reduced, optimized, secured, and accelerated data transmission and processing that can be implemented on any wired or wireless communication medium.

Another key object of the present invention is to provide a system, method, and computer program product that can more efficiently utilize existing bandwidth in communication systems and computer networks using a neural synchronization algorithm for optimizing network data frame transmission and processing through the use of data entropy encoded in a protocol, referred to as motion signal protocol (MSP), that has the structure to seamlessly integrate with any data record/frame protocol.

Yet another object of the present invention is to provide a system, method, and computer program product for reduced, optimized, secured, and accelerated data transmission that provides the operational characteristics necessary for human level intelligence processing through artificial intelligence or a human neural interface.

Another key object of the present invention is to provide a system, method, and computer program product that duplications the architecture of the human brain in order to eliminate over 99% of the existing data record/frames associated with computer data network communication.

The present invention achieves these objects and others by providing a system, method, and computer program product that implements the brain's neural synchronization algorithm for reduction, optimization, security, and acceleration of data records/frames and processing in a communication system or computer network, the system comprising one or more computer devices running a motion decimation application module and a motion reactor application module, a motion replicator module for duplicating data, a motion regulator module for controlling outbound dataflow, and a management module for configuring resources and monitoring system operation. The motion decimation application and the motion reactor application are adapted to communicate through wired and wireless means in a computer network or communications system. A motion decimation application module is the means through which data records/frames, such as data produced by computer network devices like sensors and data repositories like relational databases, is translated from its original format into data entropy and further encoded with motion signal protocol (MSP) format for reduced, optimized, secured, and accelerated transport to a motion reactor application module. A motion decimation application module also receives synchronous reply data from a motion reactor application and translates the received data to motion synchronization commands and configuration requests. A motion reactor module performs the functions of receiving data entropy from a motion decimation application and sending reply data back to the motion decimator application. A motion replicator module performs the function of using data entropy to reproduce the original computer data record/frame. The motion regulator performs the function of controlling outbound data entropy volume with additional notification signals for integration with higher forms of artificial and human intelligence.

The motion decimator application module in coordination with the motion reactor application module implement a neural synchronization processing framework that transmits data entropy through an artificial quantum entanglement to increase processing and communication efficiency over ten thousand percent (10,000%).

Further features and advantages of the present invention, as well as the structure and operation of various embodiments of the present invention, are described in detail below with reference to the accompanying drawings.

BRIEF DESCRIPTION OF THE DRAWINGS

The accompanying drawing, which is incorporated herein and forms part of the specification, illustrate various embodiments of the present invention and, together with the description, further serve to explain the principles of the invention and to enable a person skilled in the pertinent art to make and use the invention. In the drawing, like reference numbers indicate identical or functionally similar elements.

A more complete appreciation of the invention and many of the attendant advantages thereof will be readily obtained as the same becomes better understood by reference to the following detailed description when considered in connection with the accompanying drawing, wherein:

FIG. 4 is a screen capture showing the different configuration parameters necessary to implement a neural synchronization process according to the present invention.

FIG. 6 is a screen capture showing the operation of a simple artificial brain using neural synchronization to process Internet of Things (IoT) sensor devices.

FIG. 7 is a functional block diagram of the dataflow of the motion decimator application which is designed to duplicate the functional operation of the thalamus.

FIG. 8 is a functional block diagram of the dataflow of the motion reactor application which is designed to duplicate the functional operation of the primary visual cortex (V1).

DETAILED DESCRIPTION OF THE INVENTION

In the following description, for purposes of explanation and not limitation, specific details are set forth, such as particular networks, communication systems, computers, terminals, devices, components, techniques, data and network protocols, software products and systems, enterprise applications, operating systems, enterprise technologies, middleware, development interfaces, hardware, etc. in order to provide a thorough understanding of the present invention. However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, enterprise applications, operating systems, enterprise technologies, middleware, development interfaces, and hardware are omitted so as not to obscure the description of the present invention.

I. System Architecture and General Design Concepts

The design of the software for the system, method, and computer program product of the present invention takes a novel approach based upon duplicating the human brain's neurological synchronization algorithm. The system, method, and computer program product of the present invention reduces, optimizes, secures, and accelerates the transport and processing of data records/frames in communication systems and computer networks through the use of data entropy. By encoding an object's data entropy, the system, method, and computer program product of the present invention reduces standard data record/frame communication resource requirements by over 99%. The system, method, and computer program product of the present invention uses Motion Signal Protocol, referred to as "MSP" to encode and process data entropy in a like manner to human neural synchronization, thereby minimizing processing times, and increasing security, and increasing reliability, and enhancing the capabilities of artificial intelligence, and expanding the capacity of existing computer networks and systems.

A. System Architecture

Figure 1:
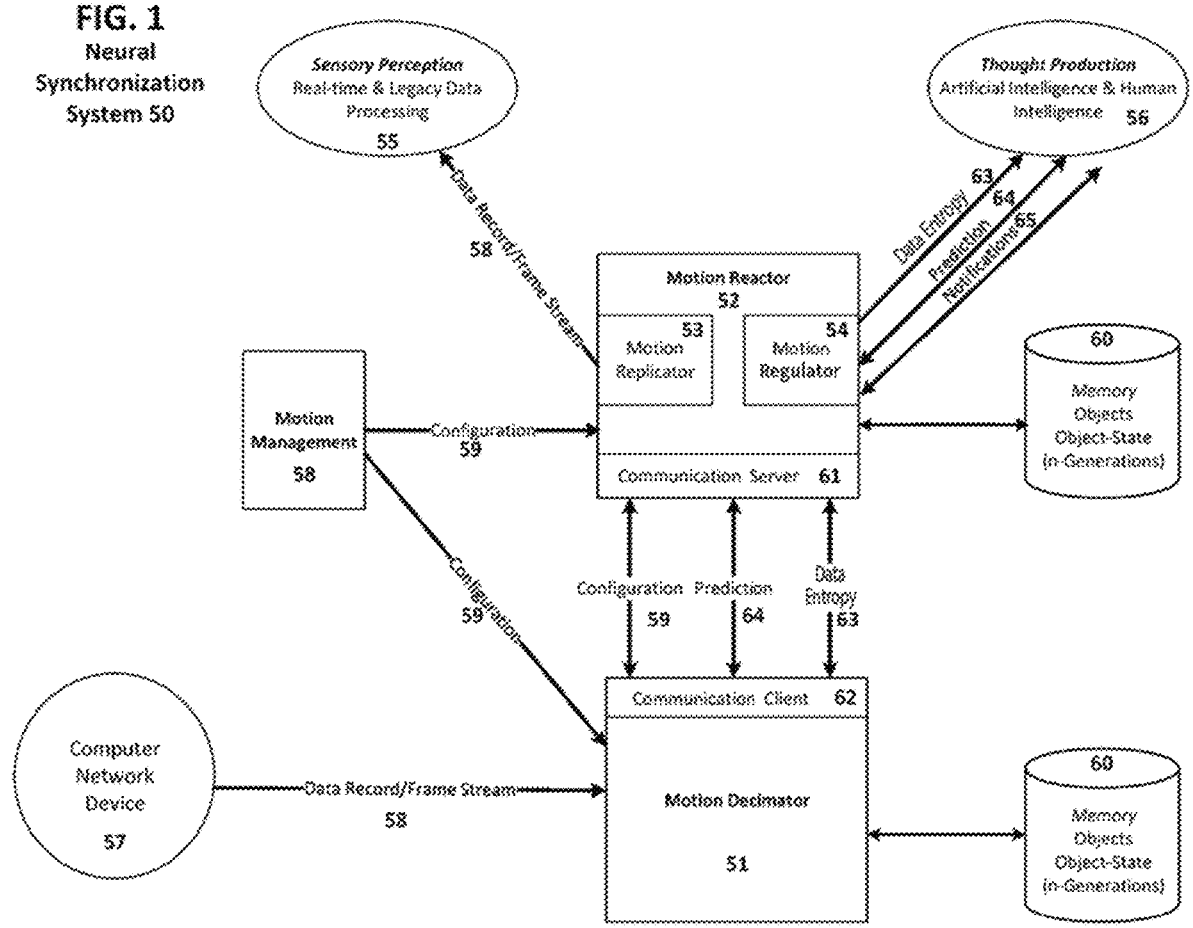
FIG. 1 is a functional block diagram of the architecture required for implementing neural synchronization for the reduction, optimization, security, and acceleration of data records/frames and the use of those data records/frames in real-time analytical decision-making according to the present invention.

With reference to FIG. 1, a functional block diagram of the architecture for a neural synchronization system 50 for reduction, optimization, security, and acceleration of data record/frame transport and processing is shown. The neural synchronization system 50 is comprised of a plurality of modules linked together to integrate into a communication system or computer network. The system is highly modularized in order to realize more efficient operation and scalability in a distributed environment, to provide increased flexibility in implementation, to support significant growth in both functionality and capacity, and to reduce complexity. Due to the modular nature of the system 50, any new software application can be developed and installed as an integrated component without significant impact on existing functions. For example, new applications will not require full regression testing through the entire system. Testing can be limited to only the new components. As a result, a significant reduction in life cycle cost can be achieved. The architecture of system 50 provides a standards-based, modular, and expandable system that incorporates new software technology to provide additional capability and capacity. In particular, the system 50 includes a motion decimator application module 51 and a motion reactor application module 52. The system 50 also includes a management application module 58 for performing administrative functions of the system 50 including configuration, logging, auditing, and security functions.

The motion decimator application module 51 is the means through which computer sensory and/or network devices 57 input a data record/frame stream 58. The motion decimator application module 51 will break down each data record/frame stream 58 into a set of objects with associated data states and will store this object information into memory 60. Memory 60 will be used to maintain the data state of each computer network device 57 indexed by a unique identifier. The motion decimator application module 51 will then compare future data record/frame stream 58 data against the predicted state maintained in memory 60 to produce data entropy 63. Data entropy 63 is encoded as a set of motion signal instructions that when applied will synchronize data states. The motion signal instructions will be used to synchronize both the local data state in memory 60 and the remote data state in memory 60 of the motion reactor application module 52.

The motion reactor application module 52 performs synchronous execution of motion signal instructions. Upon receiving data entropy 63 from the motion decimator application 51, the motion reactor application module 52 will use the encoded motion signal instructions to synchronize the data state of memory 60. Upon conclusion of a synchronization cycle, the motion reactor application module 52 will trigger the motion replicator module 53 which will reproduce the original data record/frame stream 58 and send it to a real-time or legacy data processing system 55. The motion reactor application module 52 will then trigger the motion regulator module 54 which filter and control the volume of outbound data entropy 63. The structure and operation of the main application modules 51 and 52 will be described in greater detail hereinafter following a discussion of the general design concepts of neural synchronization.

B. General Design Concepts

1. Neural Synchronization

Life is by its own nature impaled on the "arrow of time". All lifeforms must be consciously aware of the passage of time. It is part of the biological process and sits as a fundamental definition of what it means to be alive. All lifeforms achieve a conscious state through perception of their environment using sensory systems. This perception is accomplished through a rhythmic measurement of space. A biological process maintains state by performing and applying these measurements based on a linear time cycle. Since there exist no world clock (Einstein), the rhythm is set by each individual lifeform and measured relative to that lifeform (observer). So, existence is based on sensory measurements of 3-dimensional space relative to the time of observation.

Figure 2:
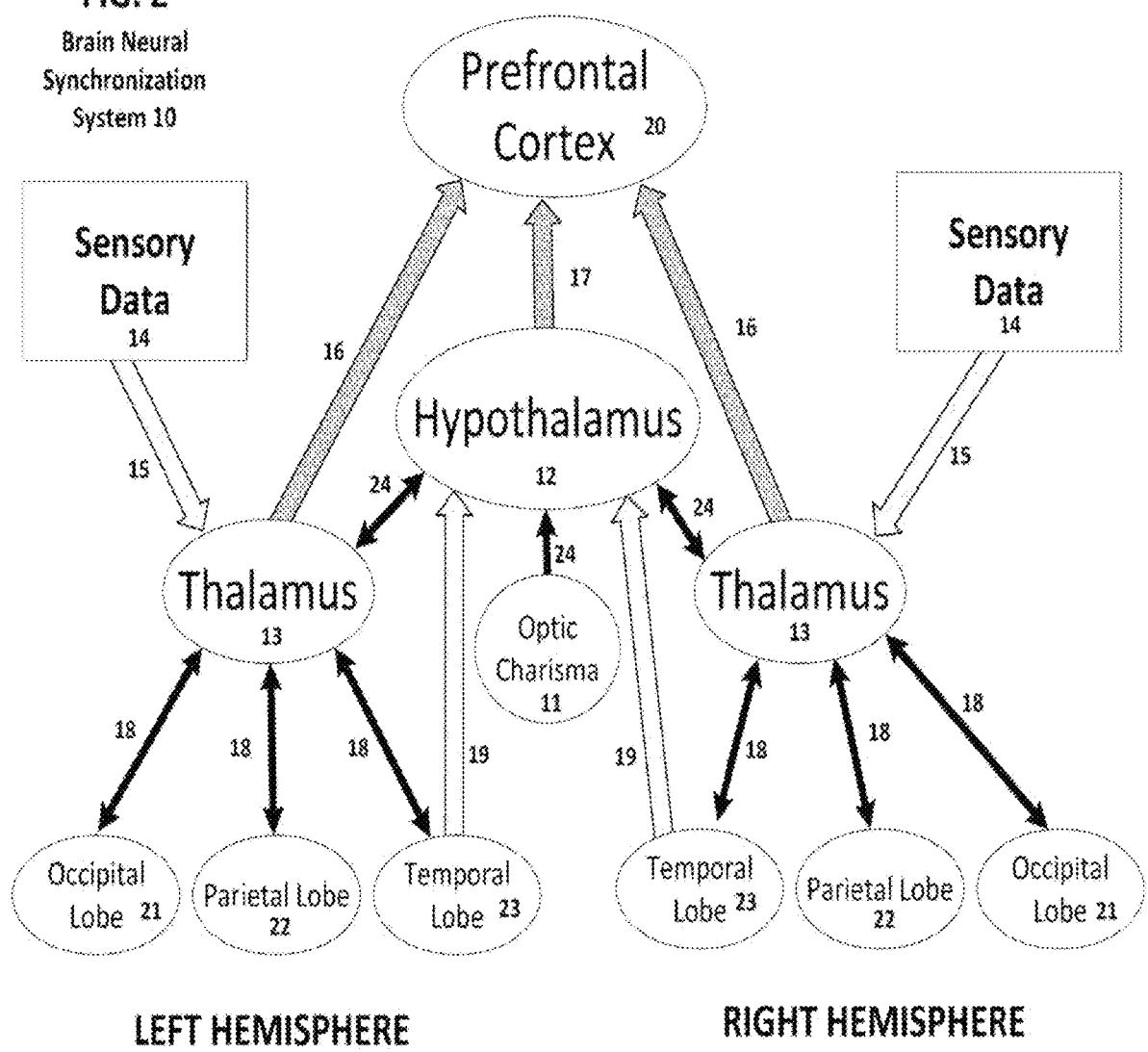
FIG. 2 is a block diagram of the neural synchronization process of the human brain. The present invention is based on duplicating the brain's data processing framework. Neural synchronization is the algorithm used to communicate enormous amounts of sensory and thought data to the different lobes, cortexes, and layers throughout the brain in real-time.

In reference to FIG. 2, in the human brain, time relativity is calibrated through the hypothalamus 12 which uses the optic charisma 11 like a stellar pulsar to establish a circadian rhythm that regulates the cycling of the biological process. By performing this function, the hypothalamus 12 serializes/sequences sensory input and synchronizes the execution of both the left and right brain hemisphere through timing connections 24.

Each brain hemisphere is individually controlled by the thalamus 13. The thalamus 13 cycles the linear firing sequence using a sophisticated set of nuclei internally sequenced. More importantly, the thalamus 13 maintains a state of neural synchronization between itself and all the lobes, cortexes, and layers through these nuclei. The reason why all thalamic connections are reciprocal is because two-way communication is mandatory to maintain a synchronous state. Neural synchronization allows the brain to exist in a single entangled quantum state as sensory measurements are cycled, processed, and applied.

All sensory data 14 arrives asynchronously. The brain does not control or synchronize the timing of the sensory observation points. Since there are many different types of sensory systems that all generate data at different intervals, the brain will not waste energy or capacity synchronizing sensory data production. Instead, the thalamus 13 provides a bridge for all the asynchronous sensory data 14 into the brain's synchronous state.

Since the thalamus 13 has an understanding of the passage of time given to it by the hypothalamus 12, each of its individual nuclei can maintain state. The thalamus 13 uses timed measurement intervals to translate all sensory data 14 into flat space-time (Minkowski). Basically, a single slice of reality. Comparing the slice of space-time against a state allows the thalamus 13 to produce a measurement of data entropy. Data entropy is encoded as set of motion signal instructions on how to change state and it doesn't matter what sensory or object format is being measured. A downstream component simply applies these motion signal instructions to keep the states synchronized in real-time.

When the thalamus 13 conducts the measurement, it will detect changes/movements in state and will categorize any detected motion as either predictable or unpredictable. Unpredictable states are accumulated and their data entropy is encoded for synchronization. Predictable states are discarded because their results are already known by the downstream component due to its shared state with thalamus 13. The knowledge is passed between components by the sheer existence of the timed neural pulse. By discarding predictable motion states, the brain achieves incredible transmission efficiency and response time between its synchronized components.

The thalamus 13 distributes the first level of derived data entropy in two directions. The first path is for sensory perception and the second path is for thought production. Since raw sensory perception requires no further refinement, it can be synchronized directly to the state maintained in the prefrontal cortex 20 through sensory perception binding point 16. The prefrontal cortex 20 maintains a state within the brain that can be described as the state of conscious reality. Human consciousness perceives and responds to the state that is maintained in the prefrontal cortex 20. The prefrontal cortex 20 is the end point for both sensory perception and thought production which are synchronized (bound) at different points within the hypothalamic/thalamic cycle.

The second direction for level 1 thalamic motion data entropy is thought production. Before a thought can be produced, it must go through a hierarchically-based system of intelligence production. The hierarchical production process converts sensory data into cognitive objects for identification, interpretation, and subsequent reaction. The thalamus 13 is responsible for coordinating the firing sequence of all the higher levels that will be executed by the different lobes of the brain, including the occipital lobe 21, parietal lobe 22, and the temporal lobe 23. At all levels, the thalamus 13 will maintain state for that level and share it with the connected component/lobe layer through synchronous connections 18. By doing this, the thalamus 13 creates a single quantum state shared in by all of its biological components.

Temporal lobe 23 will be fired towards the end of the thalamic cycle. Temporal lobe 23 has access to the memory subsystem where thought production is completed. Since the creation of a human thought has no defined timeline and searches through the memory subsystem can take additional time, the thalamic cycle cannot wait for its production. To do so would stall the brain and inhibit sensory perception. As a result, thought production is no longer synchronous and any thoughts produced must arrive asynchronously at another location in the brain using thought connection 19.

To reenter the neural synchronous state, asynchronous thought must travel back to the hypothalamus in connection 12 so that it can be sequenced and serialized. When communicating sequenced information, serialization guarantees that information arrives in that sequence. The hypothalamus 12 will coordinate thought production from the temporal lobe 23 in each hemisphere and synchronize it with the prefrontal cortex 20 in thought binding point 17. The neural synchronization system 10 represents the pinnacle of evolution in intelligence efficiency and speed. By using neural synchronization, the brain can process enormous amounts of sensory and thought data in real-time using the least amount of energy and resources.

2. Neural Synchronization of Visual Sensory Data

Figure 3:
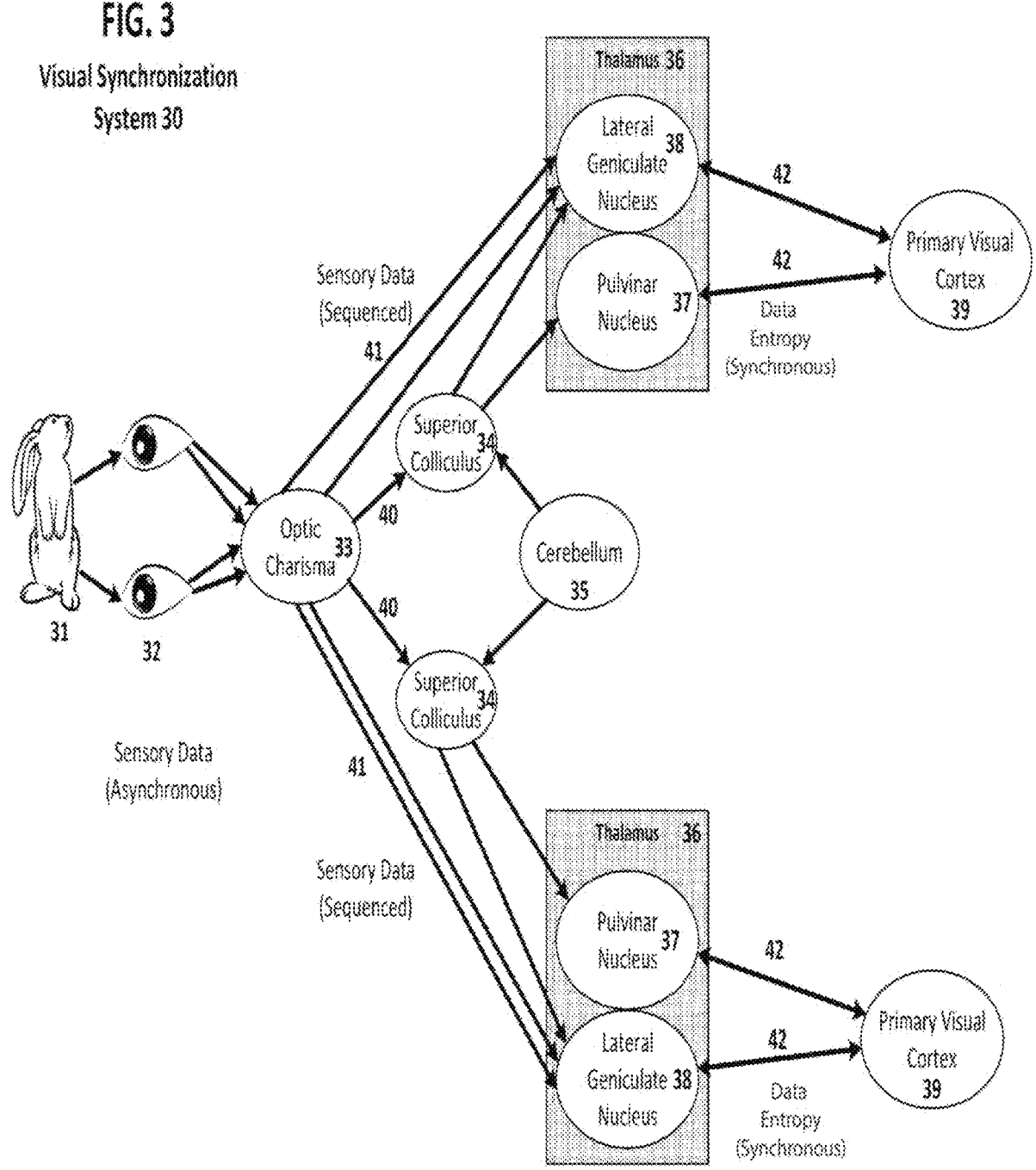
FIG. 3 is a block diagram of dataflow between human eyes and the primary visual cortex. The diagram shows the neural synchronization process as it applied to the processing of human eyesight. In particular, the diagram shows the thalamic process for converting asynchronous sensory data into a synchronous state which is a requirement for neural synchronization.

Although neural synchronization applies to all forms and derived forms of sensory and thought data, in reference to FIG. 3, neural synchronization can be best examined by tracing the level 1 data flow of the human visual synchronization system 30. This is one of the first levels of the hierarchical quantum state and demonstrates the bridging of asynchronous sensory data into the synchronous brain.

Visual Sensory Data as depicted by rabbit 31 is the origin point of light. This light travels to and arrives at both the left and right human eye 32 at the same time. This is the observation point for visual sensory data and creates four (4) asynchronous data streams each containing a 2-dimensional representations of a particular portion of sight. These four data streams intersect at the optic charisma 33 where the streams crossover. Optic charisma 33 is the first point in the brain where visual sensory data is relayed. This mixes left and right human eye 32 data together and sequences the subsequent processing of the sensory data by both the left and right brain hemispheres. Basically, it arranges the data in a linear sequence so that the two sides of the brain can eventually sync up at the downstream binding points for conscious thought and sensory perception.

The optic charisma 33 also acts as the first filtering function in visual sensory data stream. The basics of visual sensory data is that it is composed of a mixture of cones and rods. The cones contain the visual details and the rods contain visual motion. As a cone moves in space their appearance shifts to that of a rod. The Optic Charisma 33 uses this information to produce four (4) asynchronous data streams. The two primary data streams 40 carry mixed left and right eye 32 data containing only rods, representing about 10% of the original data and are destined for the superior colliculus 34. The two secondary data streams 41 carry mixed left and right eye 32 data containing cones and rods that are destined for the lateral geniculate nucleus (LGN) 38.

The primary streams 40 are the primitive foundation of sight and are centered on the detection of visual motion. This part of the visual subsystem was the first to evolve and provides an animal with an ability to react to visual motion. The superior colliculus 34 uses information from the cerebellum 35 which acts like a gyroscope to map motion (rods) to 3-dimensional space. The superior colliculus 34 uses this information and other higher level reciprocals of this information to control neck and eye movement. The output of the superior colliculus 34 is a set of rods aligned with the orientation of the head, body, and eyes. The output is destined for the pulvinar nucleus 37 and the lateral geniculate nucleus (LGN) 38 of the thalamus 36.

The secondary visual streams 41 are evolved sight processing and only available to higher life forms such as mammals, primates, and humans. These secondary streams carry the details of sight and are destined for the LGN 38 of the thalamus 36. The LGN 38 applies the orientation knowledge coming from the superior colliculus 34 by mapping the rods back into the secondary visual data stream. This aligns/stabilizes the 2-dimensional data into 3-dimensional space before data entropy measurement.

Each nuclei of thalamus maintains state including the LGN 38. The data itself creates the state. So, the LGN keeps a copy of the last sensory state for the data produced by both the left and right human eyes 32. The thalamus 36 cycles the LGN 38 at a specific time interval. This cycle establishes the measurement time where all asynchronous input is compared against the predicted synchronous state. For visual input, the state of all the cones and rods are measured. If there is a change in state, it will be classified as data entropy. Data Entropy is encoded as a set of instructions on how to change state so that any connected brain component, in this case the primary visual cortex (V1) 39, can apply the instructions to remain synchronized.

When you get to the occipital lobe, the cone and rod instructions become object instructions escalated hierarchically (V1 thru V4). Here, each layer of the occipital lobe is measured for object motion. All these different forms of sensory motion are synchronized to a multi-modal, multi-layered state control maintained in the pulvinar nucleus 37 of the thalamus 36. This is the central reason that intelligence has both bottom-up and top-down characteristics.

Before the thalamic motion is encoded for transmission to the primary visual cortex (V1) 39, the motion is classified as "Predictable" or "Unpredictable". All predictable states are discarded and only unpredictable states are encoded for neural transmission. In this Bayesian algorithmic framework rests the true power of the brain. The thalamus 36 by removing predictable motion data out of the data stream eliminates most of the incoming sensor data so that sensory perception can fit within the timing window for conscious binding.

The problem when discussing the Bayesian nature of the brain is that people's perceptions of prediction is based only on top-level cognitive objects. What is the chance a rabbit will jump left, right, or straight? While this is an activity of prediction, it misses the importance that that prediction plays in regulating and filtering sensory data within the thalamus 36. The rabbit is just a consolidated object that is composed of tens/hundreds of thousands of smaller predictions ranging from the chance that the rabbit will alter color to the chance that there will change in a visual cone. The brain's prediction is granular and has application on all levels.

As motion is bound up through components like the Occipital and Parietal Lobe, it gains greater and greater hierarchical abstraction (objectification, states-within-states). For example, sensory patterns become fingers becomes hands becomes arms and so on. Top-down knowledge is then passed back down the pulvinar nucleus 37 and used to group smaller objects for measurement; thereby, refining prediction capability. So, the sensory motion of a finger is predictable if the hand is performing a certain activity that may have been predicted by a particular arm movement.

By doing hierarchical predication in a synchronized state, the brain increases data transfer efficiency by 100,000% or more as top-down information flows down to the visual sensory level 1 (geniculate/V1 layer). This has significant implications for humans because the efficiency boost allows us to shift activity and subsequent energy use to higher brain functions. So, the less we have to do in the bottom of the brain results in the more we can do on top.

Once predicted motion data has been removed, the remaining unpredictable motion represents data entropy and is less than 1% of the original data size. This in the only information that is required in order to synchronize the state. The data entropy will then be communicated in real-time using a neural connection 42 and used to synchronize the state of the primary visual cortex 39.

Within the human visual sensory system 30 can be seen the primary function of thalamus 36 is to bridge asynchronous sensory data to the synchronous quantum state and to synchronize that state up through the various components of the brain. By performing this function, the thalamus 36 filters out all non-relevant visual sensory data and can transfer information in real-time.

II. Structure and Architecture of System and Modules

A more detailed description of the structure and software architecture of the system and modules of the present invention is provided with reference to FIG. 1. Referring to FIG. 1, the software architecture of neural synchronization system 50 is shown as implemented in a wired and wireless network, also referred to as a virtual network. The system 50 and modules of the system can implemented in, be connected to, and/or use any network or virtual network. Such networks and virtual networks include communication systems, such as local area networks, wide area networks, public access networks, internal computer bus networks, and other well-known systems, and the connections in such networks include physical, logical, virtual links, or the like, wireless or wireline connections, all of which would be readily apparent to one of ordinary skill in the art. The modularized design of the neural synchronization system 50 facilitates the implementation of the system 50 in a variety of network environments. Each of the modules described above and in more detail hereinafter can be connected, individually, to the network for communication of data and information in operation of the neural synchronization system 50.

The brain is the most highly evolved information processor in existence. It can run circles around our fastest computers. The brain accomplishes this feat not through overwhelming capacity, but through absolute efficiency. The brain does not waste energy or resources in the processing of intelligence. So, every system, every subcomponent has evolved to process information in the most efficient manner possible.

The brain is often referred to as the "Motion Muscle". This generalization is essentially correct. The ability to detect, interpret, and react to motion is the primary function of the brain. For any lifeform to perceive motion implies a biological process that has the ability to measure the passage of time. With humans, this is accomplished by the circadian rhythm produced in the SCN of the hypothalamus. This rhythm regulates the brain's execution cycle which is used to serialize sensory and thought data to a linear time-line. This enables the measurement of the same data at two different points in time which is fundamental to perceive motion. So, all motion incorporate a measurement of space based on time sequence.

Duplicating the brain's neural synchronization process requires two computer software applications running on one or more computer devices. These devices can be computer servers, desktop computers, laptop computer, network appliances, embedded devices, sensory platforms, or any hardware device that incorporates a central processing unit (CPU), memory storage, and input/output capability. Referring to FIG. 1, the motion decimator application module 51 runs on one computer device and is responsible for processing sensory and computer data input. The motion reactor application module 52 runs on the same device or a separate device and is responsible for processing sensory and computer data output. The two computer software applications work in unison duplicating the brain's neural synchronization process.

Since both software applications must be synchronized, the process begins in neural management module 58. Module 58 provides an interface that sets the configuration for both the motion decimator application module 51 and the motion reactor application module 52. Configuration information can be interfaced and stored in the computer registry, an initialization file (INI File), or in a relational database server. This provides for any form of configuration input including computer graphical interface (GUI), a text editor, or a commercial database management interface.

Figure 4:
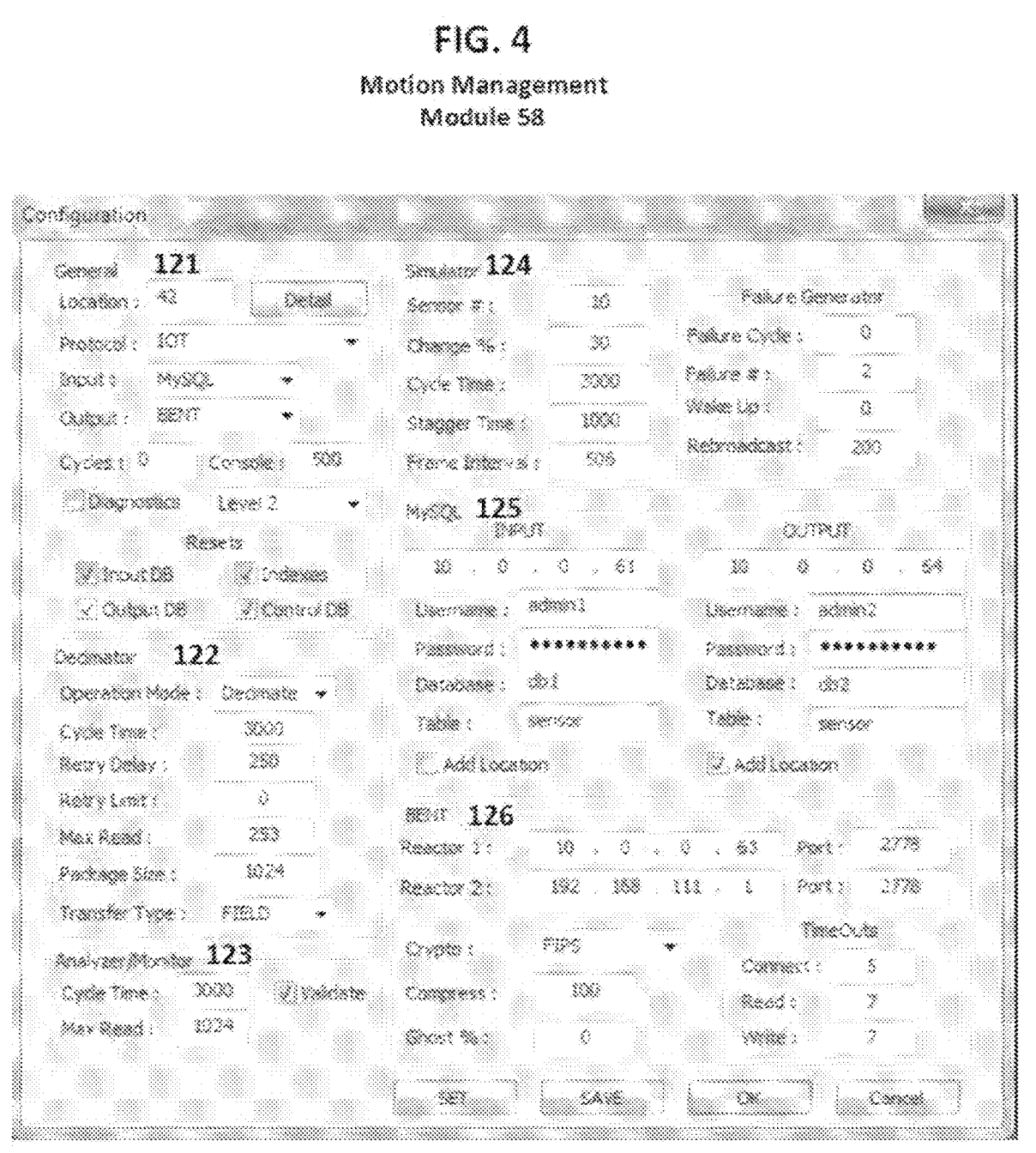

In reference to FIG. 4, motion management module 58 shows a GUI interface that sets many of the configuration controls that are necessary to implement the neural synchronization algorithm. GUI section 121 shows the general parameters necessary for synchronizing the configuration of module 51 and module 52. The Location parameter is a unique identifier to designate a pair of neural synchronization components. The Protocol parameter is currently set to Internet of Things (IoT). Neural synchronization can function effectively against any form of computer data protocol or data stream format. The two components need to agree upon protocol format so the correct set of parsing and reproduction tools/skills are applied. These computer data protocols can be preprogrammed or learned. The Input parameter designates the interface type for data input. The Input parameter is currently set to MySQL which is a standard commercial relational database interface. The Output parameter designates the interface type for data output. The Output parameter is currently set to BENT which is a network socket implementation of a light-weight messaging protocol for Internet Protocol (IP) networks. The neural synchronization process can use any form of transmission format and run on any form of computer or neural network. The next set of general parameters are associated with set diagnostic modes and various resets within the neural synchronization process.

GUI sections 122, 123, and 124 will be discussed in detail further on. GUI Section 125 contains the parameters required for the Input parameter selected. In the current selection, database access parameters are required. Each form of data input can have its own unique parameters that are separate from the protocol variable selection. This allows the interfacing of any form of data input regardless of protocol whether it comes from a database, a data stream, a memory segment, optical disk, satellite transmission, or any form of internal or external data transmission.

GUI Section 126 shows the communication parameters necessary for synchronizing with up to two motion reactor applications. Neural synchronization only requires one motion reactor application to function correctly. However, since the brain's neural synchronization is being duplicated, the system is designed to incorporate two motion reactors that function similar to the left and right brain hemispheres. GUI Section 126 contains parameters that are specific to communication messaging protocol used for sending thalamic motion. Any messaging protocol can be used with a preference for light-weight messaging protocols. GUI Section 126 will contain settings such as encryption level or timeouts that are specific to the message protocol selected. Once the configuration parameters have been set and synchronized, the motion decimation application module 51 and motion reaction application module 52 can begin computer process execution.

Referring to FIG. 1, a computer network device 57 may be any one of a number of different devices including a desktop computer, laptop computer, computer server, input/output device, personal digital assistants (PDA), a pager, a mobile phone, IP phone, electronic watch, barcode scanner, digital camera, electronic sensor, smart home device, and other network enabled devices. A computer network device 57 will produce a stream of asynchronous data record/frame stream 58. Stream 58 will be composed of information encoded in some repetitive computer data format (protocol) produced and encoded according to some linear time standard or interval.

Referring to FIG. 3, the motion decimator application module 51 reproduces the functionality of the pulvinar nucleus 37 and the lateral geniculate nucleus (LGN) 38. This functionality forms the central core of the neural synchronization process. By combining these components, neural synchronization can be implemented in a single software application. However, for incorporation into higher brain simulations and hieratical implementations, the pulvinar nucleus 37 functionality would need to be moved to its own separate computer software application. It is principally responsible for prediction management and synchronization throughout the different levels of the brain and would need to be detached to in order to function efficiency. For most computer data applications, prediction management and synchronization can be handled by the motion decimation application module 51 and the motion reactor application module 52.

The motion decimator application module 51 executes on a specific timing cycle. Referring to FIG. 4, GUI Section 122, the Cycle Time parameter in this instance has been set to 3000 milliseconds or 3 seconds with a Retry Delay parameter set to 250 milliseconds or second for precision adjustment. Since a quantum state is being maintained by the motion decimator application module 51, the cycle must complete execution before another module 51 cycle begins; otherwise, overlapping cycles will corrupt the synchronized quantum state.

Referring to FIG. 1, during each cycle the motion decimator application module 51 will first establish the measurement time which is a point for temporal and spatial decorrelation. It is basically the spot where time and space must freeze so linear measurements may occur. Time and space will remain frozen during the neural synchronization process. This is mandatory since the process involves synchronizing multiple component states separated by the speed of light.

It is important to note that the motion decimator application module 51 and the motion reactor module 52 exist in two different time frames. Like the human brain, the components are separated by distance (speed of light). Anytime space is measured, time must stop at the measurement point "Observer Effect". This creates a problem trying to synchronize a second observation point such as the motion reactor application module 52. To overcome the problem of spatial and temporal dilation, module 51 and module 52 are artificially entangled in order to share state. The entanglement is formed by synchronizing observation data entropy inside of a separate faster synchronized communication process between module 51 and module 52. By doing this, synchronous communication acts like a tunnel without time between the two components so they theoretically exist in the same state in the same moment in time even though they are separated by distance.

As one or more computer network devices 57 produce data records/frames 58, the motion decimator application module 51 will store the incoming data records/frames 58 in memory 60 organized and indexed by the unique ID of computer network device 57. The individual components (data field structures) will create memory objects each with their own data state. For example, an address data field would have an associated object and the address data in the field would be the state. The composite of all the data field states will represent the overall state of the computer network device 57.

As subsequent data record/frame 58 input arrives, the motion decimator application module 51 will compare the state of the currently read data record/frame 58 with the predicted record/frame state for computer network device 57 stored in memory 60. Any changes between the input state from record/frame 58 and the predicted state from memory 60 will be identified as data entropy 63.

If a state can be predicted, then there is no need to communicate its data while in a synchronized state. Only data entropy 63 is required. By sharing state, the motion decimator application module 51 and the motion reactor application module 52 generate and share prediction knowledge 64.

The motion decimator application module 51 takes data entropy 63 and encodes it into a Motion Signal Protocol (MSP) format to prepare it for transmission. MSP is a set of motion signal instructions that when applied will synchronize the two data states maintained in memory 60 of both module 51 and module 52. MSP will be explained in greater detail further on. The motion decimator application module 51 will process and pack all data entropy 63 motion signal instructions into a network data frame for synchronous communication to the motion reactor application module 52.

Once a network data frame is constructed and ready for transmission, the motion decimator application module 51 will pass the network data frame to the communication client module 62. The communication client module 62 will encode the network data frame in a network messaging frame and will transmit the network data frame to the motion reactor application module 52. Since this is a synchronous communication process, the motion decimator application module 51 will enter a wait state until the network data frame is processed by the motion reactor application module 52 and acknowledged. The acknowledgement signals that all MSP have been processed successfully and that memory 60 in both module 51 and module 52 are synchronized.

The motion reactor application module 52 named in reference to Newton's Laws of Motion provides high-speed data entropy network services to any number of motion decimator applications module 51. Each motion decimator application module 51 has a location code that uniquely identifies its operational and configuration requirements to the motion reactor application module 52. The motion decimator application module 51 unique ID is used by the authentication process during server connection and forms the basis for providing device-to-device security and remote configuration. Authentication can be composed of any number of levels and authentication sources that can authorize device-to-device connection. The motion reactor application module 52 is available on-demand and will facilitate secure communication sessions to the motion decimator application module 51, management agents, and other supporting software applications.

Once a motion decimator application module 51 has connected to a motion reactor application module 52, it will download any configuration 59 and prediction 64 information and will immediately begin transmitting data entropy 63 network data frames. The motion reactor application module 52 is a multi-threaded application server that launches individual motion reactor instances for each network data frame it receives. Once activated, the motion reactor application module 52 will identify the package's origin and protocol type and will set itself accordingly. The motion reactor application module 52 is designed to rapidly execute motion signal protocol ("MSP"). As each network data frame is unpacked, the motion reactor application module 52 applies the contained MSP instructions to the object states stored and maintained in memory 60. The MSP instructions provide all the necessary information to synchronize the object states that are also being maintained in memory 60 of the motion decimator application module 51. After all MSP instructions for a given network data frame are applied, the motion reactor application module 52 will provide an acknowledgement back to the motion decimation application module 51.

An MSP STOP instruction has special significance and will signal the end of the data stream of a single temporal experience. Upon receiving a MSP STOP, the motion reactor application module 52 will perform motion prediction processing and will trigger the motion replication module 53 and the motion regulator module 54. To keep the states synchronized, all predictable motion must be applied to the state maintained in memory 60 of the motion reactor application module 51. Once all predictions are applied, the states will be synchronized.

Motion replicator module 53 is responsible for either regenerating the original data protocol or generating an alternate form of data protocol. Module 53 provides the equivalent function of thalamus in that it regenerates sensory perception into prefrontal cortex memory. For computer processing, this allows output of the neural synchronization process to be either be synchronized with some type of real-time interface or integrated to a legacy data processing destination in module 55. Legacy in this definition is a data processing system that is incapable of interfacing synchronous data entropy. Since the original data stream arrived asynchronously, it has an option for departing asynchronously.

The motion replication module 52 can also be programmed to generate any type of protocol, data structuring, or Standards-based format regardless of its original format. While these data constructs have significant value to their final computer system destinations, they have little value within the neural synchronization system 50. In the translation to data entropy 63, all of these metadata components would be classified as predictable and would be subsequently removed from the network data frame. Whether these formats are added back in or substituted during motion replication is irrelevant to the process and doesn't affect the reduction, optimization, security, and acceleration of the data transmission since they are not being transmitted anyway. So, the motion replication module 52 can actively function as an inline protocol bridge between differing network data formats.

The motion regulator module 54 is responsible for filtering and controlling the volume of outbound data entropy for the purpose of interfacing higher forms of intelligence both artificial and human based 56. The neural synchronization process interfaces higher forms of intelligence 56 to receive prediction information regarding objects stored in memory 60 as a consequence of the outbound data entropy. While the motion decimation application module 51 is centered on predicting individual object motion, the next level up for intelligence production is to begin to group the individual objects in memory 60 in order to identify multiple object prediction patterns that can then be feed back down to the motion reactor application 52 with prediction 64 and synchronized with motion decimator application module 51.

The motion regulator module 54 will also classify and prioritize a set of motion notifications 65 destined for either conscious or subconscious decision-making. The following motions are used:

Low-value Predictable Motion—Signal for subconscious decision-making.

Low-value Unpredictable Motion—No signal sent, data ignored.

Medium-value Predictable Motion—Signal sent for subconscious decision-making.

Medium-value Unpredictable Motion—Signal sent for conscious notification and possible priority escalation.

High-value Predictable Motion—Signal sent for both subconscious and conscious decision-making.

High-value Unpredictable Motion—Signal sent for conscious decision-making.

The notifications are intended to provide data entropy dataflow regulation with both artificial and human intelligence interfaces to value specific areas of the data stream to help prioritize decision-making.

The motion regulator module 54 can be used to throttle the amount of data relative to the amount of available system capacity and available bandwidth. This is useful when events or special situations cause large data spikes which have a tendency to overwhelm a network. Governing the amount of data inside of the dataflow prevents data overload by preprocessing irrelevant data out of the stream by degrees. The motion regulator module 54 can be programmed with a maximum output level and will automatically adjust its OUTPUT level using various data analytics to determine data relevancy and importance. The motion regulator module 54 can be programmed with a maximum INPUT level and will work in unison with the motion decimation application module 51 by triggering its dataflow regulation functionality. The motion regulator module 54 protects the network and computer infrastructure by guaranteeing a "never to exceed" specific data capacity limit.

To summarize, the motion decimator application module 51 will capture a moment in time for data measurement. The neural synchronization system 50 can be best thought of as a system for processing linear experiences. The motion decimator application module 51 maintains object-state for any type of data that constitutes that experience. A computer network device 57 can be any device on a network that produces data records/frames 58. Sensors and smart devices are the most prevalent. A timing cycle is used to delineate the length of the experience. For each experience, the motion decimator application module 51 will:

quantify the experience to a specific time frame (temporal decorrelation) based on observation time, measure every object's (data record's) motion (spatial decorrelation) arriving from any number of computer network devices 57 at measurement time, compare experience with predicted experiences to produce data entropy 63, translate all data entropy 63 to a set of motion signal instructions, pack motion signal instructions organized by experience for network transport, transmit synchronous packed motion signal instructions to the motion reactor application module 52, share prediction knowledge with the motion reactor application module 52.

The motion reactor module 52 is a network server that functions on-demand and is initiated by the synchronous requests from the motion decimator application module 51. When a motion request is received, the motion reactor application module 52 will:

unpack motion signal instructions from the arriving network data frame, restore the timing of the experience (temporal correlation) based on observation time, apply all motion signal instructions to the existing object-state in memory 60 (spatial correlation), trigger predictable motion production, trigger motion replication to either duplicate the original data stream or bridge to another data stream, trigger motion regulator to filter and control the volume of outbound data entropy 63, acknowledge successful processing of motion signal instructions and share prediction knowledge with the motion decimator application module 51.

By using the brain's neural synchronization algorithm, the motion decimator application module 51 and the motion reactor application module 52 exchange computer data in the exact same manner as the human thalamus processes neural information to the various components in the brain. This technique increases network data efficiency by three or more orders of magnitude because 99% of data never actually has to be transported across the network to be comprehended and reproduced on the other side.

A. Motion Signal Protocol

Referring to FIG. 1, after a data record/frame 58 has been analyzed and its data entropy 63 has been identified for transmission, it will need to be converted into Motion Signal Protocol ("MSP"). Each data record/frame 58 is wrapped with a unique identifier and a set of command codes that provides instructions for applying data entropy. The motion decimator application module 51 and the motion reactor application module 52 use request/reply communication modules 61 and 62 where these motion transactions are sent and acknowledged in synchronous real-time. The identifier provides reference to the data's origin/identification and the command code tells the motion reactor application module 52 what specifically to do with the data.

Using MSP, the motion decimator application module 51 provides the motion reactor application module 52 with specific instructions on how to reproduce the data state. Both processes use object state memory 60 to maintain copies of previous data generational object-states. MSP keeps these data sources completely synchronized and only requires the smallest fraction of original record be sent across the network. If only one data field changes, then only one data field is transmitted. The data field change (data entropy 63) is all that is needed for the motion reactor application module 52 to synchronize data state.

The following motion signal codes are currently supported:

CYCLE_START—Signal marks the start of a data processing cycle and will contain the Measurement/Decorrelation Time.

CYCLE_STOP—Signal marks the stop of a data processing cycle and will initiate DEAD processing and trigger end of cycle processing.

SEED_OBJECT—Signal carries all the data fields of a record/frame and is used to seed the tracking process.

CHANGE_OBJECT—Signal carries only the changed data/frame fields which are classified as unpredictable.

CAUSE-EFFECT_OBJECT—Signal carries derived cause and effect data and is used for exchanging prediction information.

DEAD_OBJECT—Signal identifies a data source that missed its scheduled data production.

EXPERIENCE_RESET—Signal resets various states and other components within the neural synchronization process.

To mimic the human process, the motion decimator application module 51 cycles on a specific time interval to divide the data stream into specific groups of data records/ frames 58. Each data group represents a single sensory experience. The motion decimator application module 51 during each cycle will get the current time and produce a CYCLE_START motion command. This establishes the start of the experience where time is frozen (time decorrelation) and motion measurements are taken (spatial decorrelation). All data records/frames 58 produced up to the start time will be compared with predicted generations of data to produce data entropy 63, converted to motion signal instructions, and packed into high-density datasets, and encoded into a network data frame. Once all the data records within the experience are processed, the motion decimator application module 51 will create a DEAD_OBJECT for any data source that missed it scheduled production. Finally, a CYCLE_STOP command will be produced to end the experience.

Figure 5:
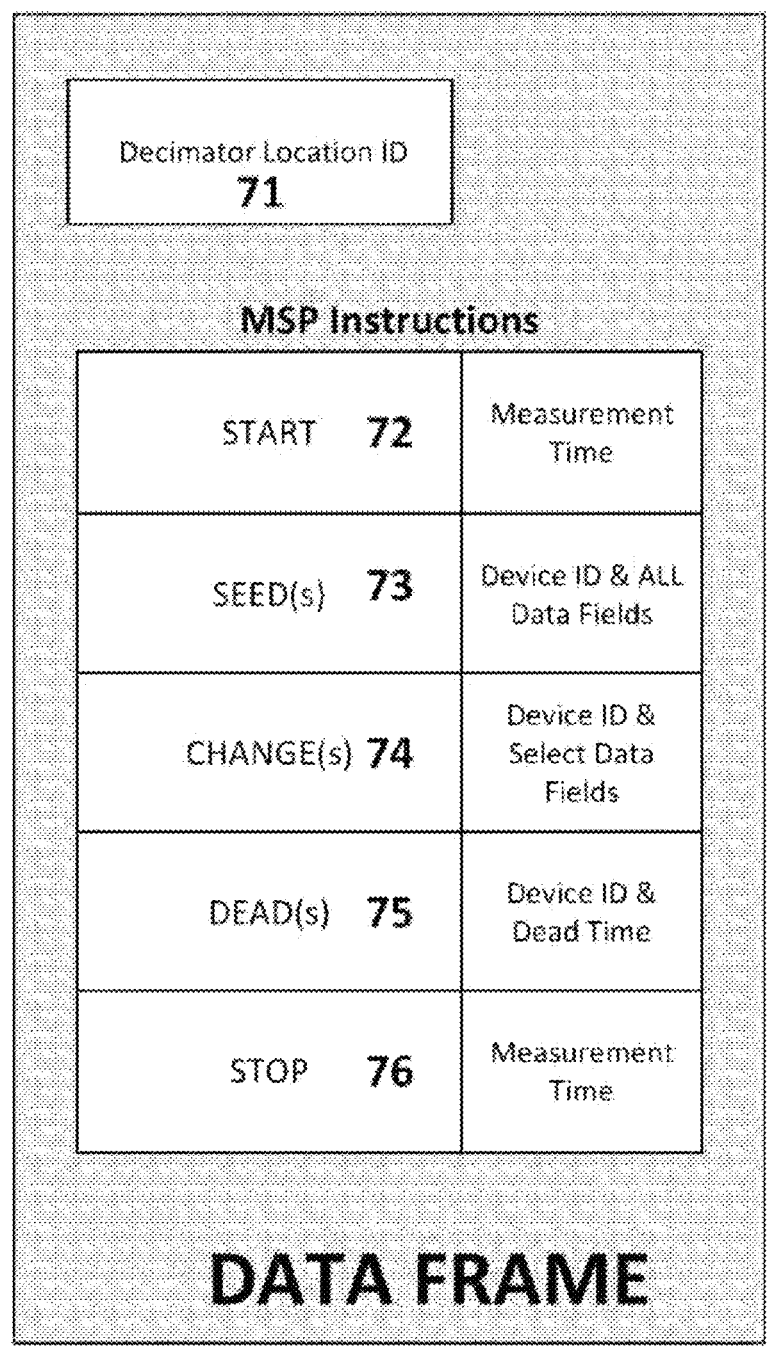
FIG. 5 is block diagram of the Motion Signal Protocol (MSP) data frame used for transmitting thalamic motion. Neural synchronization communicates using MSP in order to maintain a multicomponent synchronous state.

Referring to FIG. 5, the MSP data frame 70 shows the general layout of an MSP data frame. It carries an identifier 71 for Motion Decimator Application Module 51 and then a series of MSP instructions. Each MSP instruction can be attached to a data segment that contains either additional information or portions of the original data record/frame. MSP is designed to carry any originating input data record/frame whole or in pieces.

Motion Signal Protocol provides the ability to convert 3-dimensional space measurements into a set of linear instructions that reflect the changes in that space from one experience to the next. These instructions then can be packed into a single data frame or split across many data frames. Since the instructions are of linear nature, the communication of MSP data frames needs to be synchronous and serialized.

B. Motion Prediction

Referring to FIG. 1, prediction processing takes the following three forms which can be mixed and can be applied in ascending or descending order and can be applied at all levels of hierarchical intelligence production within a neural synchronization system 50.

1. Primitive Prediction

The primitive form uses a single generation of previous data to predict the future pattern. There are many data fields in a computer record that will show primitive motion. For example, timestamps, sequence numbers, counters, and indexes all show motion. Their associated data fields change every iteration within the time-series data stream. However, their motion values can be predicted by using a single generation of previous data. For these data fields, the distance of change is measured to identify a sequential increment/decrement that can be used to predict the next change. A SEED Instruction will produce the initial value. After that, only the unpredicted sequential increment/decrement will be encoded. For example, with a time field, if the first value received was 12:00:00 and the second value was 12:00:10, then the increment of ten (10) seconds would be sent. If the third reading is 12:00:20, then no value needs shipping because the increment has been predicted. So, even though, the time field does exhibit actual motion, it doesn't require transmission because the neural synchronization system 50 uses primitive prediction to project its future value.

2. Multigenerational Prediction

The multigenerational form uses two (2) or more generations of previous data to predict the future data pattern. A single generation of data may not reveal a motion pattern when the pattern stretches over multiple cycles of measurement. For example, when a radiation sensor detects standard background radiation, it may need several cycles to discern this from an actual radiation threat. If we assume the sensor produces a one (1) through ten (10) measurement and we are going to compare five generations of previous data to predict its future motion, consider the following:

Sensor Cycle Series #1-1,1,0,1,1 (Clear),
Sensor Cycle Series #2-0,1,0,1,1 (Clear),
Sensor Cycle Series #3-2,0,1,1,1 (Alert),
Sensor Cycle Series #4-2,0,2,0,1 (Alert),
Sensor Cycle Series #5-1,1,1,1,1 (Clear).

Multigenerational sensor readings create specific motion patterns that can be learned. More importantly, the number of data generations that are measured is equal to the number of data generations that can be predicted. So, by measuring five (5) generations in the example above, we can now attempt to predict the next five (5) generations.

Multigenerational prediction creates a rather unique operational characteristic of neural synchronization system 50 in that it allows system 50 to look forward in time in order to see back in time. Specifically, this form of prediction allows the neural synchronization system 50 to output data faster than real-time input. In the example above, system 50 can output the fifth (5th) measurement in response to the first (1st) measurement in the predicted multigenerational sequence. So, by moving output forward in time, neural synchronization system 50 can react to sensory data before its actual creation point.

This is exactly similar to the brain's operational framework for data entropy. In reference to FIG. 3, if the 1st measurement occurs at the optic charisma 33, then the second (2nd) generation measurement would be occurring at the observation point of the right and left human eye 42. In other words, sensory perception would actually be occurring at observation time which would compensate for the time it takes the brain to complete one cycle. Now, let's say that it takes 2 cycles for light travelling from the creation point of rabbit 31 to reach the right and left human eye 32. If the brain is outputting a fifth (5th) generation prediction, then sensory perception is running faster than its real-time creation.

3. Hierarchical Prediction

The hierarchical form uses high-level consolidated objects to predict the future pattern. To understand this hieratical concept consider the following example: The first level of data states consist of 1000 computer network device 57s producing facility security sensor data. The next level up, which would correspond to the second layer of the occipital lobe, would group the 1000 computer sensors into 100 rooms (objects). The third level would group the 100 rooms into 10 floors. The fourth level would group the 10 floors into 1 building. At each of these levels, consolidated object intelligence can produce prediction knowledge that can be passed back down to level 1 to refine prediction capability. A particular floor may reveal a particular prediction pattern; for instance, if the floor were empty late at night. Hierarchical Prediction has the effect of eliminating large portions of the level 1 sensory data because predicting high level objects automatically predicts all of their corresponding lower level objects in the hierarchy. So, the floor prediction provides the room predictions which provides the corresponding computer network device 57 predictions.

C. Multi-Record Packaging

Current network optimization science is focused on reducing network overhead. Internet Protocol (IP) networks can generate a lot of overhead depending on the paths taken by individual networks frames as they are relayed around the network. While this pursuit has serious relevancy, it gains are insignificant against solving the true problem. The real issue is that the industry uses far too many network frames transmitting too little information.

When dealing with data records/frames 58, the current rational is that only one data record/frame 58 can be shipped across the network at a time. So, a data record/frame 58 will always require at least one network frame. This is antiquated thinking and rooted in the human requirement of communicating one piece of information at a time. Forcing computers to send vast amounts of sensor and repetitive computer data in a two-dimensional manner reminiscent of a telephone call creates a problem that cannot be fixed. Trying to reduce overhead inside of such a model is the equivalent of bailing out a sinking ship with a teaspoon.

The best way to reduce network overhead is to break the one record-one frame approach and package multiple data records/frames together into a single network frame. This requires certain enhancements to the data frame. Specifically, the data frame is redesigned to carry a dataset, instead of a data record. A dataset is basically a computer software memory model that allows records to be stored and accessed in multiple rows. Datasets are most commonly used for storing multiple records once they have been retrieved from a database server. Multi-record packaging allows a single network frame to carry large numbers of high density data entropy objects eliminating unnecessary network frame waste.

The ratio of records to network frames will be dependent on not exceeding the maximum MTU size of 1500 bytes for typical IP networks. Exceeding this number will instantly double the amount of network overhead because an additional network frame will be required. So, the goal is to get as many data entropy objects in without going over to prevent uncontrolled frame fragmentation. With the Motion Decimator, which only extracts the changed data fields and records, a ratio from 10-to-1 up to 1000-1 is possible. By increasing data density in the MTU, most data streams will be able to reduce network frame requirements by 99%, jettison all the unnecessary network overhead, and accelerate network data delivery to near real-time.

D. Dead Reckoning

To assume success in data processing requires a system that can count the dead. When measuring generational data there is always a possibility that a given data generation goes missing or dies. In other words, the data producer failed to create its scheduled data object on time or some other intermediate system failure occurred that may have destroyed the record. Regardless, when expected data is missing out of the stream, it must be classified as an abnormality and accounted for in any system that assumes success.

Referring to FIG. 1, both the motion decimator application module 51 and the motion reactor application module 52 implement a system of Dead Reckoning where missing data records/frames 58 are identified and processed. Dead Reckoning uses both the timestamp and the sequential time increment of a record to predict success. Module 51 begins with a CYCLE_START MSP instruction and attaches the current measurement time. This timestamp will become the basis for all Dead Reckoning calculations performed by both module 51 and module 52. After all its data records/frames 58 for a given cycle (time segment) are processed, the motion decimation application module 51 will perform the following calculation on all states that were not updated during the current cycle:

IF(Current_Start_Time+
Record_Time_Increment>=Last_Record_Time)

THEN create DEAD_OBJECT

Once the dead calculation is complete, module 51 will produce a CYCLE_STOP command.

When the motion reactor application module 52 receives a CYCLE_START command, it will simply store the decorrelation timestamp for later use. Module 52 will then process all the records in the cycle including the list of DEAD_RECORDs. A CYCLE_START command has no relevancy unless there is a corresponding CYCLE_STOP command. The CYCLE_STOP command is the final motion signal to conclude an experience and generate all predicted data. At this point, module 52 will perform the following calculation:

IF(Cycle_Start_Time+
Record_Time_Increment=Last_Record_Time)
AND (!DEAD)

THEN generate predicted record

Network computer devices have success rates easily measuring above 99%. Dead Reckoning capitalizes on this success. By counting the dead, the motion decimator application module 51 provides the motion reactor application module 52 will all the knowledge it needs to reproduce the data flawlessly with the least number of bytes required and in many cases no bytes at all. Module 52 performs all reactions in real-time and produces synchronous acknowledgements to the Module 51 on the success or failure of all MSP instructions. Failures in the process can result in self-diagnostics and resets in various components within the quantum state of the neural synchronization system 50. These additional precautions are required because inaccurate dead reckoning can cause the replication of fictitious data records/frames 58.

E. Calculating Time Relativity

Data entropy is based on a precise measurement of two (2) slices of 3-dimensional space at two (2) points in linear time. In the human brain and in the motion decimator application module 51, these two points in time are created by a cycle time. All human and computer processes are identical in the sense that they all must cycle to maintain state. A key to understanding the calculation for data entropy is recognizing the difference between the data observation cycle time and the measurement cycle time. These are two (2) different points in time create a relativity problem that must be accounted for when calculating data entropy. The observation point is the time when data is first created in a computer network device 57, such as when an oxygen sensor produces a periodic reading. The measurement point is the time when the data is measured by the motion decimator application module 51.

Consider that a computer network device 57 may be producing data every 10 seconds and there may be a thousand (1000) of these device 57's all producing data at some interval of that 10 seconds. The device 57's are not synchronized with the motion decimator application module 51 and therefore exist in an asynchronous relationship. So, even if the motion decimator application cycles at the same interval of 10 seconds, all the different 57 devices may be at different points in the cycling of their own data observation process, some faster and some slower. As a result, the measurement cycle time of the motion decimator application module 51 cannot be used for calculating data entropy.

Instead, the motion calculation must be performed using the observation cycle timing of each individual computer network device 57.

The motion decimator application module 51 compensates for relativity by calculating each individual computer network device 57 based on the data record/frame observation time measured separate from its measurement cycle time. By doing the calculation this way, the motion decimator application module 51 allows the data from a computer network device 57 to enter a synchronous state while still preserving its asynchronous origin forming an artificial quantum entanglement between two sets of computer memory. This effectively separates the measurement time of the motion decimator application module 51 from the observation time data entropy calculations for f computer network devices 57. This has special significance because it allows the motion decimator application module 51 to cycle at different speeds relative to the computer network devices 57 without altering the data entropy calculation.

Time relativity is also compensated within data entropy DEAD MSP instructions. A DEAD instruction is created by the motion decimator application module 51, so the measurement time must be preserved for use by the motion reactor application module 52. This preservation is performed as part of the thalamic motion START MSP instruction which contains the measurement time. Dead reckoning calculations, as previously described, performed by the motion reactor application module 52 will use the measurement time in order to correctly interpret the time relativity to the observation point of the dead data record/frame.

F. Data Security

Data Entropy encoding is the safest method for secure data transport regardless of encryption level. It is a process where all repetitive data and frames are removed from the network transmission. Multiple frames are then condensed into packed frames of non-repetitive data. These frames are finally encrypted and transferred in real-time across the network. All methods and tools for breaking data encryption require large volumes of highly repetitive sampling data in order to crack the code. A data entropy encoding just doesn't provide enough data of a repetitive nature for these algorithms to function correctly or at all. Data entropy encoding blocks an interception and decryption by limiting time, limiting frames, limiting repetitive data, and limiting access.

More importantly, if the encryption were to be compromised, the use of the intercepted data would be severely limited. The two applications module 51 and module 52 maintain a state model of all the computer network devices 57 and that model determines how data entropy is processed in and out of the network data frame. Without this state model to interpret the data record/data frame flow, much of the data captured would be meaningless. It would be the equivalent of trying to determine the contents of a high resolution image using just a handful of assorted pixels.

Data entropy is the principal reason that neural communication has been so difficult to decipher in neuroscience. As an outside observer who does not share synchronous state, there is no foundation to understand the significance of the data entropy encoding. For example, one neuron may contain instructions for an entire image, a second may only carry instructions to update a few cones/rods, and a third carries nothing. From an outsider's perspective, it appears chaotic.

A more significant benefit of a data entropy encoding is that it reduces the data payload to such a degree that there is excess bandwidth available to implement the following two new forms of data security:

1. Ghost Data Security

Ghost Data is a process for adding fictitious data frames or data records to the data stream in controlled amounts. The Motion Decimator creates a ghost data frame and inserts it into the network data stream. The Motion Reactor identifies these ghost data frames and automatically removes them. Ghost data is based on a copy of the original data frame or record but will have its final contents systematically altered. Use of a Ghost Data stream makes it virtually impossible to distinguish what data is real since the framing cycle and packing sequence will only be known to the motion decimator application module 51 and the motion reactor application module 52 which negotiate and maintain their own internal rotating combination. Referring to FIG. 4, GUI section 126, the Ghost Parameter sets the amount of ghost data frames that are transmitted with the data entropy 63 data.

2. False Flag Security

Sensor-based data streams when measured together at any single point in time create a situational picture. Accessing and coopting that sensory picture is a vulnerability often portrayed in movies where intercepting the sensor network and changing its readings provides access to top secret facilities. Guards are completely unaware because their monitors show nothing. This type of internal attack is a genuine risk and it highlights the fact that sensor data streams are highly vulnerable to attack and many of these attacks can go undetected.

False Flag security is designed to prevent internal attacks by fooling the attackers. The motion decimator application module 51 will create a fabricated data stream where a specific pre-defined situational picture is exposed. The real decimated data stream is actually hidden inside of the false data stream. Attackers will see a completely fictitious sensor picture. Any manipulation of that picture will have no effect on standard operations and will instantly be detected.

III. Operation of System and Modules

A. Self-Diagnostic Analysis

Time is a major impediment in analyzing the results of a computer implementation of the neural synchronization process. Referring to FIG. 1, this is especially the case when analyzing a shared quantum state in real-time which is the primary function of neural synchronization system 50. Any attempts to get scientific measurements slows the timing of the cycle of the motion decimator application module 51 and subsequent operation of the motion reactor application module 52. Since the algorithmic model is based on linear time measurements, these outside measurements corrupt the data sampling. Furthermore, any attempts to perform post-analysis on the shared quantum states is useless. Since the analysis is occurring outside of real-time, it can only produce superficial results that may not be reflective of the true quantum states at the various points in the time.

The problem rest in the fact that to properly diagnose and analyze the operation of neural synchronization requires that a connected component participate in the synchronous relationship in order to perform real-time data analytics, the same way the brain does. This participation makes it a part of the neural synchronization cycle and allows the component to perform real-time data analytics in the correct sequence at the right moment in time.

The solution rests in understanding that analytics is part of a decision-making process that requires some form of interpretation. Neural synchronization system 50 duplicates the function of the human thalamus and is therefore incapable of performing interpretation. While system 50 uses interpretation, such as object identification and motion prediction, to enhance its communication efficiency, it cannot make these interpretations. Interpretation is a function of the conscious mind which can only be performed in the frontal lobe of the brain. So, the requirements for self-diagnostic analysis can only be solved by simulating a frontal lobe process and attaching it to the neural synchronization cycle. In other words, we have to add another brain component that is fast enough and in sequence to analyze the quantum state of system 50 in real-time.

The brain can be simulated using a graphical user interface software program that can cycle the motion decimation application module 51 in sequence with a data simulator and data analyzer. The analyzer is part of a frontal lobe decision-making process and is functioning as a sensory perception module 55. Basically, module 55 shares in the quantum state of the neural synchronization process. Module 55 then can perform real-time analytics to validate the individual components that make up that quantum state. In reference to FIG. 4, GUI section 123 shows the configuration for data analyzer as either a synchronous or asynchronous component. GUI section 124 shows the configuration information for the network device simulator. To provide accurate diagnostics, the analytics require the ability to set data patterns and measure it against predicted results to ensure that the process is correctly synchronizing the quantum state between components.

Referring to FIG. 1, the graphical user interface GUI that duplicates the brain will need to cycle the following three (3) components:

Computer network device 57 simulator,
Motion decimation application module 51,
Sensory perception module 55 analyzer.

Figure 6:
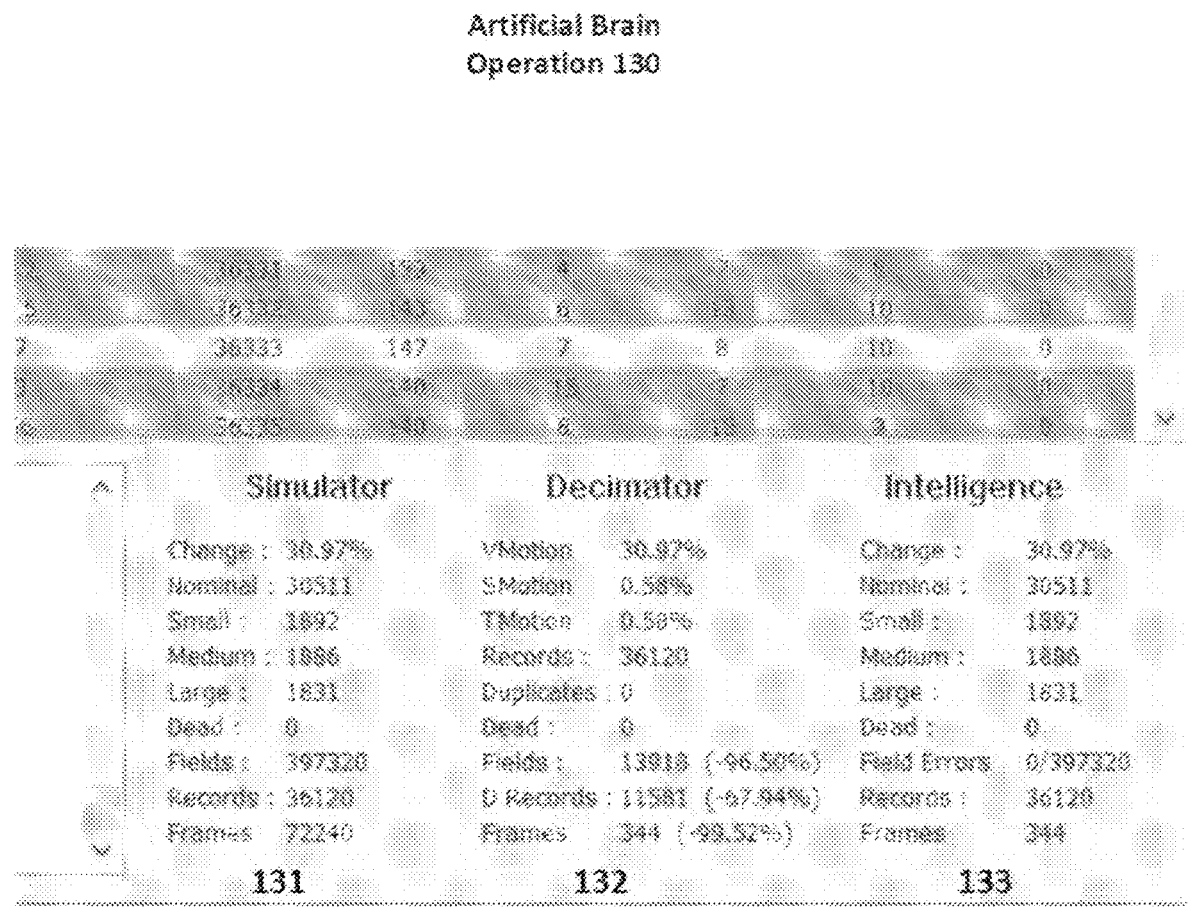

Referring to FIG. 6, GUI Sections 131, 132, and 133 show output from these three (3) components, respectively. GUI Section 133 shows the results of the self-diagnostic. Here, module 55 is displaying the shared quantum state. From this state, module 55 compares the replicated data record/frame stream 58 with the original data record/frame stream 58 to test the accuracy of its reproduction.

B. Data Entropy 63

While standards have been established and generally accepted by the industry for network access—i.e., the physical, data link, and network layers—and most all systems and applications provide for communication using Transmission Control Protocol/Internet Protocol (TCP/IP)—i.e., IP running at the OSI network layer and TCP running at the OSI transport layer, there is severe fragmentation and lack of industry adoption and agreement with respect to a protocol or language for interfacing with TCP/IP and the layers above the transport layer in the OSI model—i.e., the session, presentation, and application layers.

As a consequence of this lack of a universal protocol or language, numerous and varying protocols and languages have been, and continue to be, adopted and used resulting in significant additional overhead, complexity, and a lack of standardization and compatibility across platforms, networks, and systems. This diversity in protocols and languages, and lack of a universal language beyond the transport layer, forces the actual data being transported to be saddled with significant additional data to allow for translation as transmission of the data occurs through these various layers in the communication stack. The use of these numerous and varying protocols and languages create and, indeed, require additional layers and additional data for translation and control, adding additional overhead on top of the actual data being transported and complicating system design, deployment, operation, maintenance, and modification. The use of these numerous and varying protocols and languages also leads to the inefficient utilization of available bandwidth and available processing capacity, and result in unsatisfactory response times.

Referring to FIG. 1, the inventor of the neural synchronization system 50 of the present invention recognized the severe fragmentation and lack of industry adoption and agreement with respect to a protocol or language for interfacing with TCP/IP and the layers above the transport layer and the deficiencies caused thereby, and developed a protocol for universal data payload delivery. The architecture and design of neural synchronization system 50 of the present invention rests on the primary premise of a commonly understood principle of agnostic data description, requiring a protocol for universal data payload delivery. Thus, the inventor of the neurological system 50 of the present invention developed a simple protocol to incorporate all the other protocols, referred to as the motion signal protocol (MSP) for encoding data entropy 63 as previously described.

To understand the operation of data entropy 63 within a neural synchronization process requires that system 50 be applied to a given protocol or format from which the differences in data communication techniques can be quantified. To achieve this, neural synchronization system 50 was applied to an Internet of Things (IoT) data protocol. Referring to FIG. 6, the last line of GUI section 132 shows a 99.52% reduction in network frames using neural synchronization as opposed to current computer communication methods. What follows is a breakdown of how neural synchronization was able to perform this significant bandwidth reduction using IoT data records/frames.

C. Data Entropy Byte and Frame Reduction Formula

To project bandwidth and frame reductions using data entropy 63 requires an understanding of the amount of data currently being produced from an IoT system and some of the unique record characteristics associated with that data.

Calculations are based on the following information (all data sizes calculated in bytes):
MO=Message Overhead
  MO is composed of the network message protocol. This is the size in bytes of the light weight messaging or custom protocol needed to send the data across the network.
RO=Record Overhead
  RO is composed of all the record control header and record structural data.
TDF=Total Data Fields
  TDF is the number of data fields in the record.
AFS=Average Field Size
  AFS is the average size of the data fields.
AFO=Average Field Overhead
  AFO is the average size of field overhead. Each field will contain extra bytes in one form or another to identify the individual field.
VDF=Value Data Fields
  VDF is the number of value fields. Within a record, most of the data fields are used for identification and processing. The real value of the record rest is one or two data fields. Decimation concerns itself with these fields. The rest of record is composed of either repetitive data fields or fields with predicable data patterns.
AVS=Average Value Size
  AVS is average size in bytes of the value fields.
AVO=Average Value Overhead
  AVO is average size of field overhead needed to identify the value data field.
MPS=Motion % per Sample
  MPS is the one of the keys to subconscious data processing. It is the percentage that a value field will change. The motion decimator application module 51 measures change by its own sampling cycle since part of its function is to divide the data stream into time segments (temporal decorrelation). This number needs to correspond with the time measurement for the formula below. For example, if the motion decimator application module 51 is cycling every 3 seconds (20 times a minute) and the desire is to measure bytes per minute, then the Motion % Per Sample needs to be divided by the cycles per minute. So, if a record changes 20% per minute then its chance per change per cycle at 3 seconds is 0.2/20=0.01 or 1%. If a record changes 100% per 3 second cycle, then its overall change will be 1*20=20.00 or 2000% per minute.

DFS=Data Frame Size

DFS is size in bytes of the fully network packaged data record. The software application has finished its job and the next step is to hand the data frame to the network for processing.

NFS=Network Frame Size (1500 bytes)

NFS is the standard network frame size. In most cases, it is 1500 bytes.

PFR=Packed Frame Ratio

PFR is the number of data records that fit into one data frame. Decimation performs multi-record frame packaging based upon available network space and topology.

MCF=Message Control Frames

MCF is the total number of extra frames needed to confirm transmission. Most messaging control protocols will send data with one frame and will receive an acknowledgment with another frame. The message control frames do not generally contain many bytes, but they are mandatory to ensure the synchronization and confirmation of data transfer and execution.

RNF=Required Network Frames

RNF is the total number of network frames needed to move a data frame.

RPM=Records per Minute

RPM is the total number of records per minute produced by a data source.

x=Number of Data Sources

Standard Data Processing $$\text{Data Frame Size(DFS)}=MO+RO+(TDF*(AFS+AFO))$$

$$\text{Required Network Frames(RNF)}=ROUNDUP(DFS/NFS)$$

$$\text{Standard Byte Requirements}(y_1)=DFSx*RPM$$

$$\text{Standard Frame Requirements}(f_1)=((RNF+MCF)x*RPM).$$

Data Entropy Processing $$\text{Data Frame Size(DFS)}=(MO/PFR)+(RO+(VDF*(AVS+AVO)))*MPS$$

$$\text{Required Network Frames(RNF)}=ROUNDUP(DFS/NFS)$$

$$\text{Decimated Byte Requirements}(y_2)=DFSx*RPM$$

$$\text{Decimated Frame Requirements}(f_2)=((RNF+MCF)/PFR)x*RPM).$$

Network Reduction $$\text{Byte Reduction Percentage}=1-(y_2/y_1)$$

$$\text{Frame Reduction Percentage}=1-(f_2/f_1).$$

The following estimates were conducted using IoT data frames processed by a multi-protocol router into a local relational database and then relayed across the network to another relational database. Calculating the data frames between the databases was done using a standard SQL interface, a MQTT interface, and a neural synchronization interface. In order to standardize the results, the sampling consist of 1000 Carbon Monoxide sensors producing IoT data frames at various intervals over the course of 1 minute. The following results were calculated on a per minute basis:

| Sensor # | Motion % per Sample | Sampling Rate (Seconds) | Packed Frame Ratio | SQL (Data) (Frames) | MQTT (Data) (Frames) | Decimation (Data) (Frames) | SQL Reduction | MQTT Reduction |
|---|---|---|---|---|---|---|---|---|
| 1000 | 2% | 3 | 1000 | 4,902 KB | 5,469 KB | 10.5 KB | 99.786% | 99.808% |
|  |  |  |  | 40,000 FR | 80,000 FR | 40 FR | 99.900% | 99.950% |
| 1000 | 2% | 5 | 1000 | 2,941 KB | 3,281 KB | 6.3 KB | 99.786% | 99.808% |
|  |  |  |  | 24,000 FR | 48,000 FR | 24 FR | 99.900% | 99.950% |
| 1000 | 2% | 10 | 1000 | 1,471 KB | 1,641 KB | 3.15 KB | 99.786% | 99.808% |
|  |  |  |  | 12,000 FR | 24,000 FR | 12 FR | 99.900% | 99.950% |
| 1000 | 2% | 30 | 1000 | 490 KB | 547 KB | 1.05 KB | 99.786% | 99.808% |
|  |  |  |  | 4,000 FR | 8,000 FR | 4 FR | 99.900% | 99.950% |
| 1000 | 2% | 60 | 1000 | 245 KB | 273 KB | 0.52 KB | 99.786% | 99.808% |
|  |  |  |  | 2,000 FR | 4,000 FR | 2 FR | 99.900% | 99.950% |
| 1000 | 5% | 3 | 1000 | 4,902 KB | 5,469 KB | 25.1 KB | 99.487% | 99.540% |
|  |  |  |  | 40,000 FR | 80,000 FR | 40 FR | 99.900% | 99.950% |
| 1000 | 5% | 5 | 1000 | 2,941 KB | 3,281 KB | 15.1 KB | 99.487% | 99.540% |
|  |  |  |  | 24,000 FR | 48,000 FR | 24 FR | 99.900% | 99.950% |
| 1000 | 5% | 10 | 1000 | 1,471 KB | 1,641 KB | 7.54 KB | 99.487% | 99.540% |
|  |  |  |  | 12,000 FR | 24,000 FR | 12 FR | 99.900% | 99.950% |
| 1000 | 5% | 30 | 1000 | 490 KB | 547 KB | 2.51 KB | 99.487% | 99.540% |
|  |  |  |  | 4,000 FR | 8,000 FR | 4 FR | 99.900% | 99.950% |
| 1000 | 5% | 60 | 1000 | 245 KB | 273 KB | 1.26 KB | 99.487% | 99.540% |
|  |  |  |  | 2,000 FR | 4,000 FR | 2 FR | 99.900% | 99.950% |
| 1000 | 10% | 3 | 500 | 4,902 KB | 5,469 KB | 50.3 KB | 98.975% | 99.081% |
|  |  |  |  | 40,000 FR | 80,000 FR | 80 FR | 99.800% | 99.900% |
| 1000 | 10% | 5 | 500 | 2,941 KB | 3,281 KB | 30.2 KB | 98.975% | 99.081% |
|  |  |  |  | 24,000 FR | 48,000 FR | 48 FR | 99.800% | 99.900% |
| 1000 | 10% | 10 | 500 | 1,471 KB | 1,641 KB | 15.1 KB | 98.975% | 99.081% |
|  |  |  |  | 12,000 FR | 24,000 FR | 24 FR | 99.800% | 99.900% |
| 1000 | 10% | 30 | 500 | 490 KB | 547 KB | 5.03 KB | 98.975% | 99.081% |
|  |  |  |  | 4,000 FR | 8,000 FR | 8 FR | 99.800% | 99.900% |

-continued

| Sensor # | Motion % per Sample | Sampling Rate (Seconds) | Packed Frame Ratio | SQL (Data) (Frames) | MQTT (Data) (Frames) | Decimation (Data) (Frames) | SQL Reduction | MQTT Reduction |
|---|---|---|---|---|---|---|---|---|
| 1000 | 10% | 60 | 500 | 245 KB | 273 KB | 2.51 KB | 98.975% | 99.081% |
|  |  |  |  | 2,000 FR | 4,000 FR | 4 FR | 99.800% | 99.900% |
| 1000 | 25% | 3 | 200 | 4,902 KB | 5,469 KB | 126 KB | 97.436% | 97.702% |
|  |  |  |  | 40,000 FR | 80,000 FR | 200 FR | 99.500% | 99.750% |
| 1000 | 25% | 5 | 200 | 2,941 KB | 3,281 KB | 75.4 KB | 97.436% | 97.702% |
|  |  |  |  | 24,000 FR | 48,000 FR | 120 FR | 99.500% | 99.750% |
| 1000 | 25% | 10 | 200 | 1,471 KB | 1,641 KB | 37.7 KB | 97.436% | 97.702% |
|  |  |  |  | 12,000 FR | 24,000 FR | 60 FR | 99.500% | 99.750% |
| 1000 | 25% | 30 | 200 | 490 KB | 547 KB | 12.6 KB | 97.436% | 97.702% |
|  |  |  |  | 4,000 FR | 8,000 FR | 20 FR | 99.500% | 99.750% |
| 1000 | 25% | 60 | 200 | 245 KB | 273 KB | 6.28 KB | 97.436% | 97.702% |
|  |  |  |  | 2,000 FR | 4,000 FR | 10 FR | 99.500% | 99.750% |
| 1000 | 50% | 3 | 100 | 4,902 KB | 5,469 KB | 251 KB | 94.873% | 95.404% |
|  |  |  |  | 40,000 FR | 80,000 FR | 400 FR | 99.000% | 99.500% |
| 1000 | 50% | 5 | 100 | 2,941 KB | 3,281 KB | 151 KB | 94.873% | 95.404% |
|  |  |  |  | 24,000 FR | 48,000 FR | 240 FR | 99.000% | 99.500% |
| 1000 | 50% | 10 | 100 | 1,471 KB | 1,641 KB | 75.4 KB | 94.873% | 95.404% |
|  |  |  |  | 12,000 FR | 24,000 FR | 120 FR | 99.000% | 99.500% |
| 1000 | 50% | 30 | 100 | 490 KB | 547 KB | 25.1 KB | 94.873% | 95.404% |
|  |  |  |  | 4,000 FR | 8,000 FR | 40 FR | 99.000% | 99.500% |
| 1000 | 50% | 60 | 100 | 245 KB | 273 KB | 12.6 KB | 94.873% | 95.404% |
|  |  |  |  | 2,000 FR | 4,000 FR | 20 FR | 99.000% | 99.500% |
| 1000 | 100% | 3 | 50 | 4,902 KB | 5,469 KB | 503 KB | 89.745% | 90.807% |
|  |  |  |  | 40,000 FR | 80,000 FR | 800 FR | 98.000% | 99.000% |
| 1000 | 100% | 5 | 50 | 2,941 KB | 3,281 KB | 302 KB | 89.745% | 90.807% |
|  |  |  |  | 24,000 FR | 48,000 FR | 480 FR | 98.000% | 99.000% |
| 1000 | 100% | 10 | 50 | 1,471 KB | 1,641 KB | 151 KB | 89.745% | 90.807% |
|  |  |  |  | 12,000 FR | 24,000 FR | 240 FR | 98.000% | 99.000% |
| 1000 | 100% | 30 | 50 | 490 KB | 547 KB | 50.3 KB | 89.745% | 90.807% |
|  |  |  |  | 4,000 FR | 8,000 FR | 80 FR | 98.000% | 99.000% |
| 1000 | 100% | 60 | 50 | 245 KB | 273 KB | 25.1 KB | 89.745% | 90.807% |
|  |  |  |  | 2,000 FR | 4,000 FR | 40 FR | 98.000% | 99.000% |

D. System Operation—Functional Sequence

Referring back to FIG. 1, the end-to-end flow duplicating neural synchronization and the processing of data entropy 63 of the present invention is described. With reference to the diagrams of FIG. 7 and FIG. 8, the steps in the neural synchronization process system 50 are as follows:

1. In reference to FIG. 7, the motion decimator application module 51 executes on a specific timing interval and will execute one data processing cycle per startup request.

2. The cycle starts with module 81 and will attempt to set the measurement time. Safety checks are performed to ensure that all previous cycle processing was successfully completed. If not, the previous data cycle will be completed and resynchronized before the next sequence is started. Safety checks are performed on the network connection and session state of the motion reactor application module 52 referring to FIG. 1. If everything is correct, the motion decimator application module 51 will get the current system time to establish a CYCLE_START time, also known as the measurement time. Referring to FIG. 7, a data frame 94 will be constructed that will contain a dataset and the first record of the dataset will be a CYCLE_START Instruction.

3. Data records/frames are read one at a time by module 83. All data records/frames created up until the set measurement time will be processed. Records/frames created after the set measurement time will be processed in the next cycle.

4. For each record/frame read, module 84 will search the object state memory 85 for a previous record/frame state.

5. If no previous state exist for a current record/frame, then module 87 will create a SEED Instruction and will create a new entry in the object state memory 85. The SEED Instruction provides the necessary data to recreate the new entry in any synchronized downstream object state memory 85. A SEED will include the entire original data record/frame. The SEED will be written to the data frame 94.

6. If a previous state exists in the object state memory 85 for a current record/frame, then module 86 will measure the motion between the current data state and the predicted data state by comparing each individual data field. Motion is derived by measuring data states at a fixed time interval. Any changes in the data byte patterns will be identified as data entropy. All other data will be classified as predictable and discarded.

7. If data entropy is detected module 88 will create a CHANGE Instruction and will update the corresponding entry in the object state memory 85. The CHANGE will be written to the data frame 94.

8. Once the supply of data records/frames has been exhausted for a given time slice, the decimation system application module 51 will execute module 89 to determine dead data records/frames. Module 88 searches the object state table to find states that were not updated during the cycle. These are candidates for dead states. Module 89 then measures their motion to determine if they really dead or just not currently scheduled for production. If they are dead, then module 92 updates the object state memory 85 and a DEAD Instruction is written to the data frame 94.

9. Once dead processing is complete, the decimation application system 51 will execute module 93 to create a STOP Instruction. This concludes the linear encoding sequence for all data input for a given cycle. Module 93 will update object state memory 85 and a STOP Instruction is written to the data frame 84.

10. The final step of the cycle is to initiate module 95 for synchronous communication. If should be noted that module 95 can also be initiated prior to reaching a STOP Instruction.

All these Instructions are Motion Signal Protocol (MSP) and will be written into the dataset of the data frame up to either the maximum packing size or the maximum network frame size. If either of these conditions occur, the motion decimator application module 51 will send the data frame 94 to the motion reactor application module 52, referring to FIG. 8 and create a new data frame to hold the additional MSP.

11. In reference to FIG. 8, the motion reactor application module 52 contains a multi-threaded communication server module 101. Communication server module 101 maintains network connections and will listen for network requests from connected clients including the motion decimator application module 51. Upon receiving a network request, module 101 will launch an appropriate module to process and interpret the received data frame 112.

12. For network requests originating from motion decimator 51 module, motion reactor 52 will launch a Read Decimation Request module 102 to process the data frame 112. The data frame 112 is interpreted as depicted in FIG. 5 where it is organized into a dataset containing a linear sequence of Motion Signal Protocol (MSP) ordered first-in first-out (FIFO).

Module 102 will unload and process each MSP instruction.

13. If a MSP CYCLE_START is encountered, Module 103 with set the relative measurement time for all MSP instructions until the next MSP CYCLE_STOP. In order for the motion reactor 52 to stay synchronous, all motion interpretation and calculation must be performed at the same time relativity as the measurement point of motion decimator application module 51. Basically, the motion reactor application module 52 runs on the time set by the motion decimator application module 51. This time setting is transmitted in the MSP CYCLE_START instruction.

14. If a MSP SEED_OBJECT is encountered. Module 104 will add a new entry to object state memory 113. The SEED_OBJECT carries the entire contents (all data fields) of original data record/frame.

15. If a MSP CHANGE_OBJECT is encountered. Module 105 will update an existing entry in object state memory 113. The CHANGE_OBJECT carries any individual data fields that contain unpredictable motion. Module 105 will apply these changes in addition to any automatically generated predictable motion data fields for that object.

16. If a MSP DEAD_OBJECT is encountered, Module 106 will mark an existing object in object state memory 113 as dead (non-responsive) which is a state indicating that an object missed its scheduled data production.

17. If a MSP RESET_OBJECT is encountered, Module 107 will reset one or more objects in object state memory 113. The RESET_OBJECT carries scope information as to the extent of the reset requested. It may apply to a single field, a single entry, or the entire memory.

18. If a MSP STOP_CYCLE is encountered, Module 108 will initiate end of cycle processing which includes updating predictable records/frames Module 109, replicating records/frames Module 110, and regulating outbound data volume Module 111.

19. Module 109 will update records/frames with predictable motion. Most data records/frames have no data entropy and therefore will not generate CHANGE_OBJECTS. As a result, these data records/frames must be identified so that their predictable motion can be applied. Once a cycle has concluded, a search of the object state memory 113 will provide a list of all non-dead entries that need predictable motion generation.

20. Module 110 will perform motion replication services where the data entropy can be converted back into the original data frame/record format.

21. Module 111 will perform data regulator services where the data entropy can be assigned a notification level and used to throttle the outbound dataflow.

22. When data frame 112 has been fully processed, module 114 will provide a communication acknowledgement to the motion decimator application module 51.

23. Referring to FIG. 1, on receiving a motion reactor module 52 acknowledgement, the motion decimator module 51 will unblock and will either start construction of a new data frame or if a CYCLE_STOP was sent and acknowledged, then the motion decimator application module 51 will conclude its neural synchronization cycle.

The system, method, and computer program product of the present invention can be implemented on any wired or wireless communication medium including, but not limited to, satellite, cellular, wireless or hardwired WAN, LAN, and the like, public communication network, such as the Internet, and private communication network, such as an intranet. The design architecture of the system enables the system to easily integrate with any hardware platform, operating system, and most desktop and enterprise applications. The system is platform, network, and operating system agnostic.

The system, method, and computer program product of the present invention supports a wide range of data and network protocols, including native support for IP, XML, IoT, WAP, and other industry standard data and network protocols. The two application modules of the system, method, and computer program product of the present invention can be implemented using any operating system including, but not limited to Unix, Linux, VMS, IBM, Microsoft Windows NT, 95, 98, 2000, ME, XP, Vista, 7, 8, and 10, and the like.

Employing neural synchronization processing, the system, method, and computer program product of the present invention can transport and process any type of data including ASCII Text, EBCIDIC, binary data, such as streaming video, streaming-real-time audio, image data (e.g., x-ray films), and unicode (i.e., for carrying different dialects of languages—e.g., Chinese, Japanese). The system, method, and computer program product of the present invention provides access to and delivery of content and applications to a full range of devices, regardless of whether the devices connect over wireline or wireless networks. It further provides the ability to seamlessly service multiple connection methods, wired and wireless connectivity service options, and device types (workstations/desktops, handhelds, cell phones, etc.) at the same time.

The systems, processes, and components set forth in the present description may be implemented using one or more general purpose computers, microprocessors, or the like programmed according to the teachings of the present specification, as will be appreciated by those skilled in the relevant art(s). Appropriate software coding can readily be prepared by skilled programmers based on the teachings of the present disclosure, as will be apparent to those skilled in the relevant art(s).

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

While a preferred embodiment of the present invention has been described above, it should be understood that it has been presented by way of example only, and not limitation. Thus, the breadth and scope of the present invention should not be limited by the above described exemplary embodiment.

Obviously, numerous modifications and variations of the present invention are possible in light of the above teachings. It is therefore to be understood that the invention may be practiced otherwise than as specifically described herein.

What is claimed is:

1. A system for optimizing computer data transmission, the system comprising:
a motion decimator software module tangibly stored on a non-transitory computer readable medium comprising instructions which when executed by a processor cause the processor to:
establish a synchronous network relationship with a motion reactor software module based on a measurement cycle time;
receive a plurality of data frames based on a separate observation cycle time, where a data frame is a data structure containing a single data field composed of a single data type most commonly found in a network data stream;
set measurement cycle time faster than observation cycle time to establish the conditions necessary to process synchronous observation cycle time data frames through a separate faster synchronous measurement cycle time process to create an artificial quantum entanglement;
perform spatial and temporal decorrelation at measurement cycle time of the data frames based on the data's observation cycle time to establish an object state for each data frame;
store the decorrelated data frames and associated object states in computer memory, the stored decorrelated data frames each having a unique identifier computer memory;
compare the object states in computer memory with their predicted object states using the unique identifier to create a plurality of data entropy objects;
translate the plurality of data entropy objects into a set of motion signal instructions, that when executed by the processor will synchronize all object states in computer memory to observation time;
execute the set of motion signal instructions of the motion decimator software module to maintain separate computer memory that will represent an internal quantum state in memory; and
send the set of motion signal instructions to a connected motion reactor software module that is synchronize according to the measurement cycle time;
a motion reactor software module tangibly stored on a non-transitory computer readable medium comprising instructions which when executed by a processor cause the processor to:
receive the set of motion signal instructions of the motion decimator software module;
synchronously execute the set of motion signal instructions of the motion decimator software module to maintain separate computer memory that will represent an internal quantum state in memory;
trigger a motion replication module to regenerate either the original or an alternate form of the data frames based on their observation cycle time;
trigger a motion regulator module to filter and control the volume of outbound data entropy; and
transmit prediction data and execution status of the set of motion signal instructions to the motion decimator software module.

2. The system of claim 1, wherein the plurality of data frames are packetized into a single network data frame.

3. The system of claim 1, further comprising a security module tangibly stored on a non-transitory computer readable medium comprising instructions which when executed by the processor cause the processor to prevent decryption of the plurality of data frames using a data entropy encoding to limit time, limit frames, limit repetitive data, and limit access.

4. The system of claim 3, wherein the security module comprises ghost data security and false flag security, where ghost data security inserts fictious data at various points in the network data stream whose points represent a combination key, where false flag security hides the correct network data stream inside elements of a false network data stream.

5. A method for optimizing computer data transmission, the method comprising:
a motion decimator software module tangibly stored on a non-transitory computer readable medium comprising instructions which when executed by a processor cause the processor to:
establish a synchronous network relationship with a motion reactor software module based on a measurement cycle time;
receive a plurality of data frames based on a separate observation cycle time, where a data frame is a data structure containing a single data field composed of a single data type most commonly found in a network data stream;
set measurement cycle time faster than observation cycle time to establish the conditions necessary to process synchronous observation cycle time data frames through a separate faster synchronous measurement cycle time process to create an artificial quantum entanglement:
perform spatial and temporal decorrelation at measurement cycle time of the data frames based on the data's observation cycle time to establish an object state for each data frame;
store the decorrelated data frames and associated object states in computer memory, the stored decorrelated data frames each having a unique identifier in computer memory;
compare the object states in computer memory with their predicted object states using the unique identifier to create a plurality of data entropy objects;
translate the plurality of data entropy objects into a set of motion signal instructions, that when executed by the processor will synchronize all object states in computer memory to observation time:
execute the set of motion signal instructions of the motion decimator software module to maintain separate computer memory that will represent an internal quantum state in memory; and
send the set of motion signal instructions to a connected motion reactor software module that is synchronize according to the measurement cycle time;
a motion reactor software module tangibly stored on a non-transitory computer readable medium comprising instructions which when executed by a processor cause the processor to:

receive the set of motion signal instructions of the motion decimator software module;

synchronously execute the set of motion signal instructions of the motion decimator software module to maintain separate computer memory that will represent an internal quantum state in memory;

trigger a motion replication module to regenerate either the original or an alternate form of the data frames based on their observation cycle time;

trigger a motion regulator module to filter and control the volume of outbound data entropy; and transmit prediction data and execution status of the set of motion signal instructions to the motion decimator software module.

6. The method of claim 5, wherein the plurality of data frames are packetized into a single network data frame.

7. The method of claim 5, further comprising a security module tangibly stored on a non-transitory computer readable medium comprising instructions which when executed by the processor cause the processor to prevent decryption of the plurality of data frames using a data entropy encoding to limit time, limit frames, limit repetitive data, and limit access.

8. The method of claim 7, wherein the security module comprises ghost data security and false flag security, where ghost data security inserts fictious data at various points in the network data stream whose points represent a combination key, where false flag security hides the correct network data stream inside elements of a false network data stream.

9. A system for optimizing computer data transmission, the system comprising:

a motion decimator software module tangibly stored on a non-transitory computer readable medium comprising instructions which when executed by a processor cause the processor to:

establish a synchronous network relationship with a motion reactor software module based on a measurement cycle time;

receive a plurality of data records based on a separate observation cycle time, where a data record is a data structure containing multiple data fields composed of different data types most commonly found in a relational database server;

set measurement cycle time faster than observation cycle time to establish the conditions necessary to process synchronous observation cycle time data records through a separate faster synchronous measurement cycle time process to create an artificial quantum entanglement;

perform spatial and temporal decorrelation at measurement cycle time of the data records based on the data's observation cycle time to establish an object state for each data record;

store the decorrelated data records and associated object states in computer memory, the stored decorrelated data records each having a unique identifier in computer memory;

compare the object states in computer memory with their predicted object states using the unique identifier to create a plurality of data entropy objects;

translate the plurality of data entropy objects into a set of motion signal instructions, that when executed by the processor will synchronize all object states in computer memory to observation time;

execute the set of motion signal instructions of the motion decimator software module to maintain separate computer memory that will represent an internal quantum state in memory; and send the set of motion signal instructions to a connected motion reactor software module that is synchronize according to the measurement cycle time;

a motion reactor software module tangibly stored on a non-transitory computer readable medium comprising instructions which when executed by a processor cause the processor to:

receive the set of motion signal instructions of the motion decimator software module;

synchronously execute the set of motion signal instructions of the motion decimator software module to maintain separate computer memory that will represent an internal quantum state in memory;

trigger a motion replication module to regenerate either the original or an alternate form of the data records based on their observation cycle time;

trigger a motion regulator module to filter and control the volume of outbound data entropy; and transmit prediction data and execution status of the set of motion signal instructions to the motion decimator software module.

10. The system of claim 9, wherein the plurality of data records are packetized into a single network data frame.

11. The system of claim 9, further comprising a security module tangibly stored on a non-transitory computer readable medium comprising instructions which when executed by the processor cause the processor to prevent decryption of the plurality of data records using a data entropy encoding to limit time, limit frames, limit repetitive data, and limit access.

12. The system of claim 11, wherein the security module comprises ghost data security and false flag security, where ghost data security inserts fictious data at various points in the network data stream whose points represent a combination key, where false flag security hides the correct network data stream inside elements of a false network data stream.

13. A method for optimizing computer data transmission, the method comprising:

a motion decimator software module tangibly stored on a non-transitory computer readable medium comprising instructions which when executed by a processor cause the processor to:

establish a synchronous network relationship with a motion reactor software module based on a measurement cycle time;

receive a plurality of data records based on a separate observation cycle time, where a data record is a data structure containing multiple data fields composed of different data types most commonly found in a relational database server;

set measurement cycle time faster than observation cycle time to establish the conditions necessary to process synchronous observation cycle time data records through a separate faster synchronous measurement cycle time process to create an artificial quantum entanglement;

perform spatial and temporal decorrelation at measurement cycle time of the data records based on the data's observation cycle time to establish an object state for each data record;

store the decorrelated data records and associated object states in computer memory, the stored decorrelated data records each having a unique identifier in computer memory;

compare the object states in computer memory with their predicted object states using the unique identifier to create a plurality of data entropy objects;

translate the plurality of data entropy objects into a set of motion signal instructions, that when executed by the processor will synchronize all object states in computer memory to observation time;

execute the set of motion signal instructions of the motion decimator software module to maintain separate computer memory that will represent an internal quantum state in memory; and send the set of motion signal instructions to a connected motion reactor software module that is synchronize according to the measurement cycle time;

a motion reactor software module tangibly stored on a non-transitory computer readable medium comprising instructions which when executed by a processor cause the processor to:

receive the set of motion signal instructions of the motion decimator software module;

synchronously execute the set of motion signal instructions of the motion decimator software module to maintain separate computer memory that will represent an internal quantum state in memory;

trigger a motion replication module to regenerate either the original or an alternate form of the data records based on their observation cycle time;

trigger a motion regulator module to filter and control the volume of outbound data entropy; and transmit prediction data and execution status of the set of motion signal instructions to the motion decimator software module.

14. The method of claim 13, wherein the plurality of data records are packetized into a single network data frame.

15. The method of claim 13, further comprising a security module tangibly stored on a non-transitory computer readable medium comprising instructions which when executed by the processor cause the processor to prevent decryption of the plurality of data records using a data entropy encoding to limit time, limit frames, limit repetitive data, and limit access.

16. The method of claim 15, wherein the security module comprises ghost data security and false flag security, where ghost data security inserts fictious data at various points in the network data stream whose points represent a combination key, where false flag security hides the correct network data stream inside elements of a false network data stream.

* * * * *